(12) United States Patent
Liao et al.

(10) Patent No.: US 11,567,965 B2
(45) Date of Patent: Jan. 31, 2023

(54) ENHANCED PREPARATION AND INTEGRATION OF DATA SETS

(71) Applicant: MicroStrategy Incorporated, Vienna, VA (US)

(72) Inventors: Rixin Liao, Herndon, VA (US); Nannan Yu, Fairfax, VA (US); Hongbo Liu, Herndon, VA (US); Scott Rigney, Arlington, VA (US); Benjamin Reyes, Great Falls, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 17/156,112

(22) Filed: Jan. 22, 2021

(65) Prior Publication Data

US 2021/0232592 A1 Jul. 29, 2021

Related U.S. Application Data

(60) Provisional application No. 62/964,730, filed on Jan. 23, 2020.

(51) Int. Cl.
*G06F 16/25* (2019.01)
*G06F 16/2455* (2019.01)
(Continued)

(52) U.S. Cl.
CPC ........ *G06F 16/258* (2019.01); *G06F 16/2456* (2019.01); *G06F 16/24568* (2019.01); *G06F 16/283* (2019.01); *G06N 20/00* (2019.01)

(58) Field of Classification Search
CPC .............. G06F 16/258; G06F 16/2456; G06F 16/24568; G06F 16/283; G06N 20/00
See application file for complete search history.

(56) References Cited

U.S. PATENT DOCUMENTS

| 4,769,772 A | 9/1988 | Dwyer |
| 5,414,469 A | 5/1995 | Gonzales et al. |

(Continued)

OTHER PUBLICATIONS

[No Author Listed], "Deploy Enterprise Analytics Applications Using the Native Hadoop Gateway," Powerpoint, Dec. 13, 2017, 41 pages.

(Continued)

*Primary Examiner* — Dangelino N Gortayo
(74) *Attorney, Agent, or Firm* — Fish & Richardson P.C.

(57) ABSTRACT

Methods, systems, and apparatus, including computer programs encoded on computer-storage media, for enhanced preparation and integration of data sets. In some implementations, data indicating user input that identifies a first data set that includes streaming data and a second data set that includes non-streaming data is received. The first data set and the second data set are integrated to generate a hybrid data set. The data processing system provides access to the hybrid data set through a (i) non-streaming access channel that provides a periodically-refreshed summary of both the streaming data and the non-streaming data and (ii) a streaming access channel that provides a data stream based on combined data of the first data set and the second data set. One or more application programing interfaces are provided. The one or more application programming interfaces allow at least one client device to access the non-streaming access channel and the streaming access channel.

20 Claims, 6 Drawing Sheets

(51) Int. Cl.
*G06N 20/00* (2019.01)
*G06F 16/28* (2019.01)

(56) References Cited

U.S. PATENT DOCUMENTS

| | | | |
|---|---|---|---|
| 5,590,319 | A | 12/1996 | Cohen et al. |
| 6,442,522 | B1 | 8/2002 | Carberry et al. |
| 6,701,294 | B1 | 3/2004 | Ball et al. |
| 7,181,444 | B2 | 2/2007 | Porter et al. |
| 7,356,840 | B1 | 4/2008 | Bedell et al. |
| 7,827,125 | B1 | 11/2010 | Rennison |
| 8,024,666 | B2 | 9/2011 | Thompson |
| 8,103,608 | B2 | 1/2012 | Green et al. |
| 8,296,475 | B2 | 10/2012 | Kottomtharayil et al. |
| 8,402,052 | B2 | 3/2013 | Sano et al. |
| 8,495,627 | B2 | 7/2013 | Barsness et al. |
| 8,695,009 | B2 | 4/2014 | Vojnovic et al. |
| 8,825,720 | B1 | 9/2014 | Xie et al. |
| 8,886,631 | B2 | 11/2014 | Abadi et al. |
| 8,924,978 | B2 | 12/2014 | Meng et al. |
| 8,996,523 | B1 | 3/2015 | Fisher |
| 9,092,266 | B2 | 7/2015 | Boutin et al. |
| 9,128,763 | B2 | 9/2015 | Sarkar et al. |
| 9,129,448 | B2 | 9/2015 | Bekmambetov |
| 9,141,611 | B2 | 9/2015 | Crook |
| 9,183,540 | B2 | 11/2015 | Eberlein et al. |
| 9,229,950 | B2 | 1/2016 | Chen et al. |
| 9,411,853 | B1 | 8/2016 | Dovrtel et al. |
| 9,411,861 | B2 | 8/2016 | Bestgen et al. |
| 9,456,049 | B2 | 9/2016 | Soundararajan et al. |
| 9,514,220 | B1 | 12/2016 | Wright |
| 9,672,122 | B1 | 6/2017 | Gandhi et al. |
| 10,095,759 | B1 | 10/2018 | Cappiello |
| 10,108,676 | B2 | 10/2018 | Li |
| 10,223,376 | B2 | 3/2019 | Lee et al. |
| 10,255,320 | B1 | 4/2019 | Cappiello |
| 10,303,557 | B2 | 5/2019 | Pradhan et al. |
| 10,635,669 | B1 | 4/2020 | Cappiello |
| 10,740,005 | B1 | 8/2020 | Ives et al. |
| 2002/0032676 | A1 | 3/2002 | Reiner et al. |
| 2003/0233403 | A1 | 12/2003 | Bae et al. |
| 2004/0165780 | A1 | 8/2004 | Maki et al. |
| 2005/0050036 | A1 | 3/2005 | Araki |
| 2005/0091283 | A1 | 4/2005 | Debique et al. |
| 2005/0102371 | A1 | 5/2005 | Aksu |
| 2005/0187977 | A1 | 8/2005 | Frost |
| 2005/0203878 | A1 | 9/2005 | Brill et al. |
| 2006/0004674 | A1 | 1/2006 | Tesser |
| 2006/0053171 | A1 | 3/2006 | Eldridge et al. |
| 2006/0155687 | A1 | 7/2006 | Chou |
| 2006/0155688 | A1 | 7/2006 | Chou |
| 2006/0227970 | A1 | 10/2006 | Nakano |
| 2007/0112754 | A1 | 5/2007 | Haigh et al. |
| 2007/0130131 | A1 | 6/2007 | Porter et al. |
| 2007/0208690 | A1 | 9/2007 | Schneider et al. |
| 2007/0245383 | A1 | 10/2007 | Bhide et al. |
| 2008/0005677 | A1 | 1/2008 | Thompson |
| 2008/0033915 | A1 | 2/2008 | Chen et al. |
| 2008/0033925 | A1 | 2/2008 | Richards et al. |
| 2008/0155197 | A1 | 6/2008 | Li et al. |
| 2008/0172362 | A1 | 7/2008 | Shacham et al. |
| 2008/0189655 | A1 | 8/2008 | Kol et al. |
| 2008/0250021 | A1 | 10/2008 | Boys et al. |
| 2009/0104123 | A1 | 4/2009 | Yang et al. |
| 2009/0112949 | A1 | 4/2009 | Ergan et al. |
| 2009/0164412 | A1 | 6/2009 | Bestgen et al. |
| 2009/0287673 | A1 | 11/2009 | Chronister et al. |
| 2009/0327883 | A1 | 12/2009 | Robertson et al. |
| 2010/0131254 | A1 | 5/2010 | Rubin et al. |
| 2011/0040733 | A1 | 2/2011 | Sercinoglu et al. |
| 2011/0137850 | A1 | 6/2011 | Mourey et al. |
| 2011/0225288 | A1 | 9/2011 | Easterday et al. |
| 2011/0264657 | A1 | 10/2011 | Hoffman et al. |
| 2011/0302583 | A1 | 12/2011 | Abadi et al. |
| 2011/0314057 | A1 | 12/2011 | Banfer |
| 2012/0016678 | A1 | 1/2012 | Gruber et al. |
| 2012/0023101 | A1 | 1/2012 | Heimendinger et al. |
| 2012/0084296 | A1 | 4/2012 | Waters |
| 2012/0102053 | A1 | 4/2012 | Barrett et al. |
| 2012/0136649 | A1 | 5/2012 | Freising et al. |
| 2012/0179714 | A1 | 7/2012 | Chandhok et al. |
| 2012/0226804 | A1 | 9/2012 | Raja et al. |
| 2012/0233191 | A1 | 9/2012 | Ramanujam |
| 2013/0013552 | A1 | 1/2013 | Eshleman et al. |
| 2013/0013883 | A1 | 1/2013 | Kottomtharayil et al. |
| 2013/0018903 | A1 | 1/2013 | Taranov |
| 2013/0097177 | A1 | 4/2013 | Fan et al. |
| 2013/0132967 | A1 | 5/2013 | Soundararajan et al. |
| 2013/0166547 | A1 | 6/2013 | Pasumarthi et al. |
| 2013/0166573 | A1 | 6/2013 | Vaitheeswaran et al. |
| 2013/0191418 | A1 | 7/2013 | Martin, Jr. et al. |
| 2013/0241926 | A1 | 9/2013 | Asaria et al. |
| 2013/0254155 | A1 | 9/2013 | Thollot et al. |
| 2014/0025626 | A1 | 1/2014 | Mefford et al. |
| 2014/0040306 | A1 | 2/2014 | Gluzman et al. |
| 2014/0095480 | A1 | 4/2014 | Marantz et al. |
| 2014/0095505 | A1* | 4/2014 | Blanchflower ......... G06F 16/13 707/E17.089 |
| 2014/0101139 | A1 | 4/2014 | Gemert et al. |
| 2014/0149446 | A1 | 5/2014 | Kuchmann-Beauger et al. |
| 2014/0149839 | A1 | 5/2014 | Bedard et al. |
| 2014/0195558 | A1 | 7/2014 | Murthy et al. |
| 2014/0280032 | A1 | 9/2014 | Kornacker et al. |
| 2014/0280372 | A1 | 9/2014 | Huras et al. |
| 2014/0310712 | A1 | 10/2014 | Meng et al. |
| 2014/0358845 | A1 | 12/2014 | Mundlapudi et al. |
| 2014/0365429 | A1 | 12/2014 | Wagner et al. |
| 2014/0372427 | A1 | 12/2014 | Lehmann et al. |
| 2015/0006518 | A1 | 1/2015 | Baumgartner et al. |
| 2015/0066896 | A1* | 3/2015 | Davis ................. G06F 16/9038 707/710 |
| 2015/0135255 | A1 | 5/2015 | Theimer et al. |
| 2015/0169688 | A1 | 6/2015 | Halverson et al. |
| 2015/0178052 | A1 | 6/2015 | Gupta et al. |
| 2015/0193719 | A1 | 7/2015 | Than et al. |
| 2015/0212663 | A1 | 7/2015 | Papale et al. |
| 2015/0242856 | A1 | 8/2015 | Dhurandhar et al. |
| 2015/0248501 | A1 | 9/2015 | Kamel et al. |
| 2015/0317362 | A1 | 11/2015 | Teranishi |
| 2015/0347450 | A1 | 12/2015 | Phelan et al. |
| 2015/0355989 | A1 | 12/2015 | Hayden et al. |
| 2016/0048584 | A1 | 2/2016 | Valentin |
| 2016/0105328 | A1 | 4/2016 | Cooper et al. |
| 2016/0154852 | A1 | 6/2016 | Chen et al. |
| 2016/0239487 | A1 | 8/2016 | Potharaju et al. |
| 2017/0039209 | A1 | 2/2017 | Gupta et al. |
| 2017/0039281 | A1 | 2/2017 | Venkata et al. |
| 2017/0063912 | A1* | 3/2017 | Muddu ............... G06F 16/9024 |
| 2017/0220633 | A1 | 8/2017 | Porath et al. |
| 2017/0270209 | A1 | 9/2017 | Mueller et al. |
| 2018/0052898 | A1* | 2/2018 | Allan ..................... G06F 8/34 |
| 2018/0081798 | A1 | 3/2018 | Alcantara et al. |
| 2018/0182398 | A1 | 6/2018 | Halstvedt et al. |
| 2018/0308149 | A1 | 10/2018 | Guo et al. |
| 2019/0121802 | A1 | 4/2019 | Venkataraman et al. |
| 2019/0124099 | A1* | 4/2019 | Matselyukh ............ H04L 43/16 |
| 2019/0259041 | A1* | 8/2019 | Jackson .......... G06Q 10/06315 |
| 2019/0310977 | A1 | 10/2019 | Pal et al. |
| 2019/0384759 | A1 | 12/2019 | Cappiello et al. |
| 2020/0012638 | A1 | 1/2020 | Luo et al. |
| 2020/0019546 | A1 | 1/2020 | Luo et al. |
| 2020/0250191 | A1 | 8/2020 | Cappiello |
| 2021/0157813 | A1 | 5/2021 | Hammad et al. |
| 2021/0173714 | A1 | 6/2021 | Huang et al. |

OTHER PUBLICATIONS archives.microstrategy.com [online], "How to Use Natural Language Queries," 2019, retrieved on Feb. 13, 2020, retrieved from URL <https://doc-archives.microstrategy.com/producthelp/11.0/Workstation/WebHelp/Lang_103 3/Content/nlq.htm>, 2 pages.
archives.microstrategy.com [online], "What's New in MicroStrategy 11.0," 2019, retrieved on Feb. 13, 2020, retrieved from URL

(56) References Cited

OTHER PUBLICATIONS

<https://doc-archives.microstrategy.com/producthelp/11.0/Readme/content/whats_new.htm>, 8 pages.
Borthakur, "HDFS Architecture Guide," The Apache Software Foundation, 2006, 13 pages.
Cheng, "Conversing with Your Data Using Natural Language to Boost Self-Service Analytics," MicroStrategy, Jan. 2019, 31 pages.
community.microstrategy.com [online], "Connecting to Hadoop with MicroStrategy," Jun. 7, 2017, retrieved on Mar. 23, 2020, retrieved from URL <https://community.microstrategy.com/s/article/Connecting-to-Hadoop-with-MicroStrategy?language=en US>, 3 pages.
community.microstrategy.com [online], "KB248914: Overview and installation of the MicroStrategy 10.0-10.5 Secure Enterprise Platform Hadoop Gateway (Big Data Engine)," May 30, 2017. retrieved on Mar. 23, 2020, retrieved from URL <https://community.microstrategy.com/s/article/KB248914-Overview-and-installation-of-the-MicroStrategy-10?language=en US>, 6 pages.
community.microstrategy.com [online], "KB275774: How to connect the MicroStrategy Enterprise Platform 10.x to Apache Spark SQL," May 11, 2017, retrieved on Mar. 23, 2020, retrieved from URL <https://community.microstrategy.com/s/article/KB275774-How-to-connect-the-MicroStrategy-Enterprise-Platform-10?language=en_US>, 5 pages.
community.microstrategy.com [online], "KB442148: Natural Language Query in A Nutshell in MicroStrategy Web," Nov. 26, 2019, retrieved on Feb. 13, 2020, retrieved from URL <https://community.microstrategy.com/s/article/Natural-Language-Query-in-A-Nutshell-MicroStrategy-11-0?language=en US>, 14 pages.
community.microstrategy.com [online], "Natural Language Homepage," Apr. 2017, retrieved on May 26, 2020, retrieved from URL <https://community.microstrategy.com/s/article/Natural-Language-Homepage?language=en US>, 5 pages.
doc-archives.microstrategy.com [online], "Analyzing Big Data in MicroStrategy," Oct. 7, 2016, retrieved on Mar. 23, 2020, retrieved from URL <https://doc-archives.microstrategy.com/producthelp/10.7/WebUser/WebHelp/Lang_1033/Content/mstr_big_data.htm>, 21 pages.
doc-archives.microstrategy.com [online], "Introduction to the MicroStrategy Hadoop Gateway," 2019, retrieved on Mar. 23, 2020, retrieved from URL <https://doc-archives.microstrategy.com/producthelp/10.11/InstallConfig/WebHelp/Lang 1033/Content/hadoop_gateway_intro.htm>, 2 pages.
Eltabakh, "Hadoop: A Framework for DataIntensive Distributed Computing," Powerpoint presentation at Worcester Polytechnic Institute, Spring 2012, 28 pages.
en.wikipedia.org [online], "Apache Hadoop," Mar. 2019, retrieved on Mar. 23, 2020, retrieved from URL <https://en.wikipedia.org/wiki/Apache_Hadoop>, 12 pages.
en.wikipedia.org [online], "Apache Spark," May 2019, retrieved on Mar. 23, 2020, retrieved from URL <https://en.wikipedia.org/wiki/Apache_Spark>, 8 pages.
en.wikipedia.org [online], "Scala (programming language)," Jan. 2019, retrieved on Mar. 23, 2020, retrieved from URL <https://en.wikipedia.org/wiki/Scala_(programming_language)>, 29 pages.
ibm.com [online], "HDFS Scale an Apache Hadoop cluster to hundreds of nodes with the Hadoop Distributed File System (HDFS)," May 28, 2019, retrieved on Mar. 24, 2020, retrieved from URL <https://www.ibm.com/analytics/hadoop/hdfs>, 5 pages.
juvo.be [online], "Gartner Magic Quadrant for Business Intelligence and Analytics Platforms," Feb. 2013, retrieved May 26, 2020, retrieved from URL <https://www.juvo.be/blog/gartner-magic-quadrant-business-intelligence-and-analytics-platforms>, 53 pages.
Maru et al., "Tapping Into Hadoop and NoSQL Data Sources with MicroStrategy," Powerpoint Presentation at MicroStrategy World 2014, 2014, 38 pages.
microstrategy.com [online], "How to Use Natural Language Queries," Sep. 2018, retrieved on May 26, 2020, retrieved from URL <https://www2.microstrategy.com/producthelp/current/MSTRWeb/WebHelp/Lang_1033/Content/nlq.htm>, 2 pages.
microstrategy.com [online], "Installing MicroStrategy Hadoop Gateway," 2017, retrieved on Mar. 23, 2020, retrieved from URL <https://www2.microstrategy.com/producthelp/10.4/InstallConfig/Content/InstallationConfig/installing_microstrategy_hadoop_gateway.htm>, 8 pages.
microstrategy.com [online], "What's new in MicroStrategy 10.11," Apr. 10, 2018, retrieved on Mar. 23, 2020, retrieved from URL <https://www.microstrategy.com/getmedia/5466690f-f81a-4cf4-8f16-e0d1fa22069Q/MicroStrategy-release-notes_10-11>, 36 pages.
microstrategy.com [online], "What's new in MicroStrategy 11.0," 2018, retrieved on Feb. 13, 2020 retrieved from URL <https://www.microstrategy.com/getmedia/93eb0bcc-5aa3-4100-a39d-3f53eb1f73dd/microstrategy-release-notes_11-0>, 34 pages.
mindmajix.com [online], "MicroStrategy Latest Version (11.0)—New Features," Jan. 2019, retrieved on May 26, 2020, retrieved from URL <https://mindmajix.com/microstrategy-11-0-version-new-features>, 18 pages.
ProPublica [online], "Chapter 1. Using Google Refine to Clean Messy Data," Nguyen, Dec. 30, 2010, retrieved on Sep. 2, 2015, retrieved from URL <https://www.propublica.org/nerds/item/using-google-refine-for-data-cleaning>, 10 pages.
searchbusinessanalytics.techtarget.com [online], "4 ways natural language querying in BI tools can benefit users," Dec. 2018, retrieved on May 26, 2020, retrieved from URL <https://searchbusinessanalytics.techtarget.com/feature/4-ways-natural-language-querying-in-BI-tools-can-benefit-users>, 5 pages.
Shvachko et al., "The Hadoop Distributed File System," IEEE, 2010, 10 pages.
smartbridge.com [online], "What you need to know about the new and improved MicroStrategy Dossier," Jul. 2019, retrieved on May 26, 2020, retrieved from URL <https://smartbridge.com/what-you-need-to-know-about-the-new-and-improved-microstrategy-dossier/>, 8 pages.
theta.co.nz [online], "MicroStrategy version 10 enables big data engine support," Nov. 18, 2015, retrieved on Mar. 23, 2020, retrieved from URL <https://www.theta.co.nz/news-blogs/tech-blog/microstrategy-version-10-enables-big-data-engine-support/>, 3 pages.
towardsdatascience.com [online], "Big Data From B to A: The Hadoop Distributed Filesystem—HDFS," Nov. 25, 2019, retrieved on Mar. 23, 2020, retrieved from URL <https://towardsdatascience.com/big-data-from-b-to-a-the-hadoop-distributed-filesystem-hdfs-992612cbf8aa>, 6 pages.
Wikipedia [online], "OpenRefine," last updated Jul. 15, 2015, retrieved on Sep. 2, 2015, tetrieved from URL <https://en.wikipedia.org/wiki/OpenRefine>, 4 pages.

\* cited by examiner

ENHANCED PREPARATION AND INTEGRATION OF DATA SETS

CROSS-REFERENCE TO RELATED APPLICATION

This application claims the benefit of U.S. Provisional Application No. 62/964,730, filed Jan. 23, 2020, and titled "Enhanced Preparation and Integration of Data Sets," which is incorporated by reference.

TECHNICAL FIELD

The present specification relates to databases and data analytics.

BACKGROUND

Increasing amounts of data are generated every day. Many people rely on data from databases and other sources to make decisions in business, government, and other settings. In many cases, data sets are not in the appropriate form necessary to interpret and use the data, and significant operations may be needed to import data sets into an application for use.

SUMMARY

In some implementations, a computer system is configured to enhance the process of importing and preparing data sets for use in an analytics platform. The system can include machine learning functionality that can accelerate the process of importing and preparing data. The machine learning functionality can be used to generate various recommendations for improving and enriching a data set. For example, a data preparation engine can automatically perform or recommend operations such as filtering data, joining data sets, adding derived columns, aggregating data, transforming data sets, enriching data sets with information from other sources, generating data models, forming a data hierarchy, data masking, data formatting, and so on. The machine learning functionality can also be used to automatically or semi-automatically interpret the elements of the data set and build a semantic layer for the data set. In many cases, the system can enhance a data set based on actions previously taken to prepare or process other data sets.

The system can also facilitate the combination of multiple data sets, even for data sets of very different types. For example, the system can integrate a typical structured data set (e.g., tables with rows and column) with a streaming or real-time data feed (e.g., social media streams, stock quote streams, transaction streams, and so on). The computer system provides infrastructure that allows the resulting integrated data set to be used seamlessly across any typical uses of structured data (e.g., reports, dashboards, visualizations, machine learning processing, etc.), even though the integrated data set has characteristics of both static structured data and dynamic data streams. For example, the system can manage updating of the integrated data set on an ongoing basis, whether the integrated data set is accessed in the form of a data cube, a static table or set of tables, a message stream, or in another representation. For example, as new data comes in for the streaming data component of the integrated data set, system aggregates and summarizes the data stream to include data types and data structures that can be accessed functionality not intended to consume an ongoing data stream. For example, the data stream can be processed to provide a rolling average, summary of steamed data over one or more different time periods, or another function can be applied to the time-series data, so that a representation of the data set can be provided as columns of data or in another form and still be updated on an ongoing basis as new streamed data is received. In some cases, the system derives data types, attributes, metrics, and other elements from the data stream, and the integrated data set presents a sliding window (e.g., rolling averages; maximum, minimum, sum, or count over a time period) of the data stream in a column form or other representation.

The repeated refreshing of the data set and other enhancements to a data set can be done in a way that is transparent to applications that access the data set. As a result, for a hybrid, integrated data set based on streaming and non-streaming data, the integrated data set can provide information from both input data types in streaming format by selectively supplementing streaming data with relevant data from the non-streaming sources. In addition, the non-streaming data can include processed versions of windows or aspects of the streaming data in non-streaming data, such as dynamic columns or records that are regularly updated (e.g., showing aggregated data for the last minute of the data stream, and/or the last 5 min, 15 min, 1 hour, 1 day, etc.). The updates to the non-streaming representations of the data stream can be done periodically, on-demand, or dynamically in response to requests to access the representation. In this way, the integrated data set can be held out by the system as if it were a data cube, a streaming data source, a relational database, or another type of data storage, with at least some aspects of both the streaming and non-streaming data being accessible using the data access formats and application programming interfaces of any of them.

In one general aspect, a method for integrating real-time streams and non-streaming data sets in a data processing system, provides: receiving, by one or more computers of the data processing system, data indicating user input that identifies (i) a first data set that includes streaming data and (ii) a second data set that includes non-streaming data; integrating the first data set and the second data set to generate a hybrid data set, where the data processing system provides access to the hybrid data set through a (i) non-streaming access channel that provides a periodically-refreshed summary of both the streaming data and the non-streaming data and (ii) a streaming access channel that provides a data stream based on combined data of the first data set and the second data set; and providing, by the one or more computers, one or more application programing interfaces, where the one or more application programming interfaces allow at least one client device to access the non-streaming access channel and the streaming access channel.

Implementations may include one or more of the following features. For example, in some implementations, integrating the first data set and the second data set to generate the hybrid data set includes generating a data cube that includes multiple processing pipelines for different levels of aggregation of component data sets, including data sets published in different portions of the data processing system, where the component data sets include at least the first data set and the second data set, where the non-streaming access channel is a first pipeline of the multiple processing pipelines, and where the a streaming access channel is a second pipeline of the multiple processing pipelines.

In some implementations, integrating the first data set and the second data set to generate the hybrid data set includes: providing the first data set and the second data set as input to a machine learning model; obtaining an output from the machine learning model, where the output of the machine learning model indicates a level of similarity between at least a portion of the first data set and at least a portion of the second data set; and using the output of the machine learning model to integrate the first data set and the second data set into the hybrid data set, or to generate a recommendation for integrating the first data set and the second data set into the hybrid data set includes using the level of similarity between the at least portion of the first data set and the at least portion of the second data set to (i) identify the at least portion of the first data set and the at least portion of the second data set, and (ii) determine that the at least portion of the first data set and the at least portion of the second data set should be integrated.

In some implementations, integrating the first data set and the second data set to generate the hybrid data set includes: providing the first data set and the second data set as input to a machine learning model; obtaining an output from the machine learning model, where the output of the machine learning model indicates one or more recommended actions to integrate the first data set with the second data set into the hybrid data set; and using the output of the machine learning model to integrate the first data set and the second data set into the hybrid data set, or to generate a recommendation for integrating the first data set and the second data set into the hybrid data set includes: performing the one or more recommended actions with the first data set and the second data set to generate the hybrid data set; or generating a notification that includes the one or more recommended actions, and transmitting the notification to one or more client devices.

In some implementations, integrating the first data set and the second data set to generate the hybrid data set includes: accessing historical data that indicates how one or more other data sets have previously been integrated; determining, from the historical data, one or more actions to integrate the first data set with the second data set; and integrating at least a portion of the first data set with at least a portion of the second data set by performing the one or more actions, or generating a recommendation to integrate least a portion of the first data set with at least a portion of the second data set, where the recommendation includes an indication of the one or more actions.

In some implementations, the method includes generating signatures that interrelate previously performed actions in the historical data with particular characteristics of data sets that the previously performed actions were performed on, and storing the signatures in the historical data, where determining, from the historical data, the one or more actions to integrate the first data set with the second data set includes: determining characteristics for the first data set and the second data set; identifying one or more signatures in the historical data that correspond to the first data set and the second data set by comparing the characteristics for the first data set and the second data set to the characteristics corresponding to different signatures in the historical data; and selecting the one or more actions in the historical data that correspond to the one or more signatures.

In some implementations, determining the characteristics for the first data set and the second data set includes: sampling the first data set to obtain a first subset of data; sampling the second data set to obtain a second subset of data; and analyzing the first subset of data and the second subset of data to determine the characteristics.

In some implementations, analyzing the first subset of data and the second subset of data includes at least one of the following: comparing the first subset of data and the second subset of data to determine a level of similarity between the first subset of data and the second subset of data; determining a type of data in the first subset of data, the second subset of data, or both the first subset of data and the second subset of data; determining a cardinality of the first subset of data, the second subset of data, or both the first subset of data and the second subset of data; determining a distribute of the first subset of data, the second subset of data, or both the first subset of data and the second subset of data; determining a range of values in the first subset of data, the second subset of data, or both the first subset of data and the second subset of data; determining a variance of the first subset of data, the second subset of data, or both the first subset of data and the second subset of data; determining a data size of the first subset of data, the second subset of data, or both the first subset of data and the second subset of data; determining a data source of the first subset of data, the second subset of data, or both the first subset of data and the second subset of data; determining a date and time associated with the first subset of data, the second subset of data, or both the first subset of data and the second subset of data; or determining a user associated with the first subset of data, the second subset of data, or both the first subset of data and the second subset of data.

In some implementations, generating signatures that interrelate previously performed actions in the historical data with data sets having particular characteristics includes generating signatures that specify one or more of the following: a level of similarity between data sets; a particular data type of a data set or a portion of a data set; a cardinality of a data set or a portion of a data set; a distribution of a data set or a portion of a data set; a range of values in of a data set or a portion of a data set; a variance of a data set or a portion of a data set; a data size or data size range of a data set or a portion of a data set; a data source of a data set or portion of a data set; a date or time associated with a data set or a portion of a data set; or a user associated with a data set or a portion of a data set.

In some implementations, determining the one or more actions to integrate the first data set with the second data set to generate the hybrid data set includes determining a set of preprocessing actions to perform on at least one of the first data set or the second data set prior to integrating the first data set and the second data set, where the preprocessing actions may include performing one or more of the following: removing a portion of data from the first data set; removing a portion of data from the second data set; modifying a format of at least a portion of data in the first data set; modifying a format of at least a portion of data in the second data; applying a series of transformation to the first data set; applying a series of transformations to the second data set; sampling the first data set; or sampling the second data set.

In some implementations, determining the one or more actions to integrate the first data set with the second data set to generate the hybrid data set includes determining to cache at least a portion of the first data set.

In some implementations, determining the one or more actions to integrate the first data set with the second data set to generate the hybrid data set includes determining to join at least a portion of the first data set with at least a portion of the second data set.

In some implementations, determining the one or more actions to integrate the first data set with the second data set to generate the hybrid data set includes determining to visualize at least a portion of the data sets, where at least a portion of the data sets includes one or more of the following: at least a portion of the first data set; at least a portion of the second data set; a join of at least a portion of the first data set with at least a portion of the second data set; or an overlay of at least a portion of the first data set and at least a portion of the second data set.

In some implementations, determining to visualize the at least portion of the data sets includes determining to visualize the at least portion of the data sets as one or more histograms that describe different characteristics of the at least portion of the data sets.

In some implementations, determining the one or more actions to integrate the first data set with the second data set to generate the hybrid data set includes determining to add (i) a structured data element to the first data set, the second data set, or to a data set resulting from a combination of the first data set and the second data set, (ii) one or more labels to the first data set, the second data set, or to a data set resulting from a combination of the first data set and the second data set, (iii) one or more metrics to the first data set, the second data set, or to a data set resulting from a combination of the first data set and the second data set, (iv) one or more sources to the first data set, the second data set, or to a data set resulting from a combination of the first data set and the second data set, (iv) one or more access control restrictions to the first data set, the second data set, or to a data set resulting from a combination of the first data set and the second data set, or (v) data from one or more data sets that are third-parties with respect to the first data set and the second data set to the first data set, the second data set, or to a data set resulting from a combination of the first data set and the second data set.

In some implementations, receiving the first data set that includes the streaming data includes receiving a data set that includes one or more substantially-real-time streams.

In some implementations, receiving the first data set that includes the streaming data includes receiving a data set that includes at least one of social media data, telemetry data, network traffic data, transaction data, or user input data.

In some implementations, receiving the second data set that includes the non-streaming data includes receiving a data set that includes at least one of batch data or static data.

In another general aspect, a method includes: receiving, by one or more computers, data indicating user input that identifies a data set; generating, by the one or more computers, semantic data for the data set, the semantic data indicating a semantic interpretation for at least a portion of the data set; providing, by the one or more computers, feature data indicating characteristics of the data set to one or more machine learning models; adjusting, by the one or more computers, the data set based on output generated by the one or more machine learning models in response to receiving the feature data; and providing, by the one or more computers, access to the adjusted data set to one or more client devices.

Implementations may include one or more of the following features. For example, in some implementations, the data set is a first data set, the method includes identifying a second data set related to the first data set, where the second data set is a streaming data set, and adjusting the data set includes generating the adjusted data set by combining data from the second data set with data from the first data set.

In some implementations, the first data set is a structured data set having a plurality of columns, and combining data from the second data set with data from the first data set includes: adding an additional column to the plurality of columns; and populating the additional column with a set of values determined based on an aggregation of a portion of the second data set streamed over a particular period of time.

In some implementations, the method includes repeatedly updating the set of values for the additional column, where the set of values is updated based on aggregations of the second data set streamed over a different period of time.

In some implementations, the method includes periodically updating the values for the additional column as additional streaming data is received in the second data set, where updates to the set of values are based on different sliding windows of the streaming data in the second data set, the sliding windows representing a same duration of time.

In some implementations, the streaming data feed includes a substantially-real-time feed.

In some implementations, the streaming data feed includes social media data, telemetry data, network traffic, transaction data, or user input data.

In some implementations, the method includes: determining, based on output generated by the one or more machine learning models in response to receiving the feature data, an adjustment to the data set; providing a recommendation to make the determined adjustment to the data set; and receiving data indicating additional user input accepting the recommendation, where adjusting the data set is performed in response to receiving the data indicating the additional user input.

In some implementations, providing a recommendation includes providing the user a preview of the data set having the determined adjustment applied.

In some implementations, the adjustment includes: performing a data table operation on the data set; performing a union, join, or diff operation for the data set with respect to a second data set; deriving an additional attribute, metric, or data element grouping for the data set; defining a threshold for the data set; enriching the data set to include data from a second data set; applying a label to a portion of the data set; specifying a data type for a portion of the data set; creating an aggregation of a portion of the data set; or setting a formatting property for a portion of the data set.

In some implementations, the one or more machine learning models are trained based on data indicating characteristics of a plurality of data sets and previous actions performed to alter the data sets in the plurality of data sets, where the method includes identifying, based on output generated by the one or more machine learning models in response to receiving the feature data, an operation to alter the data set that was previously performed for one or more of the data sets in the plurality of data sets.

In some implementations, the one or more machine learning models comprise an artificial neural network, a maximum entropy classifier, a decision tree, a support vector machine, or a regression model.

In some implementations, the method includes: identifying a third-party data source that is not specified by the user; and providing data recommending integration of data from the third-party data source with the data set.

In some implementations, generating the semantic data for the data set includes, determining, for at least a first portion of the data set: a label for the first portion; a data type of the first portion; a classification of the first portion; a text description of the first portion; data indicating a relationship of the first portion with another portion of the data set; data indicating an object type of the first portion in a semantic graph; or a date, time, location, person, or organization associated with the first portion.

In some implementations, the method includes storing the adjusted data set as a data package that integrates the adjusted data set with the semantic data.

In some implementations, the method includes storing the data set and the semantic data in an enhanced online analytical processing cube in a predetermined format In some implementations, the method includes receiving data for a streaming data source that receives an ongoing stream of data; accessing data indicating expected parameters for data from the streaming data source, where the expected parameters are based on user-specified rules or analysis of data previously received from the streaming data source; determining, based on evaluating the data from the streaming data source, that the data received from the streaming data source is outside the expected parameters; and in response to determining that the data received from the streaming data source is outside the expected parameters, providing a notification to a user.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
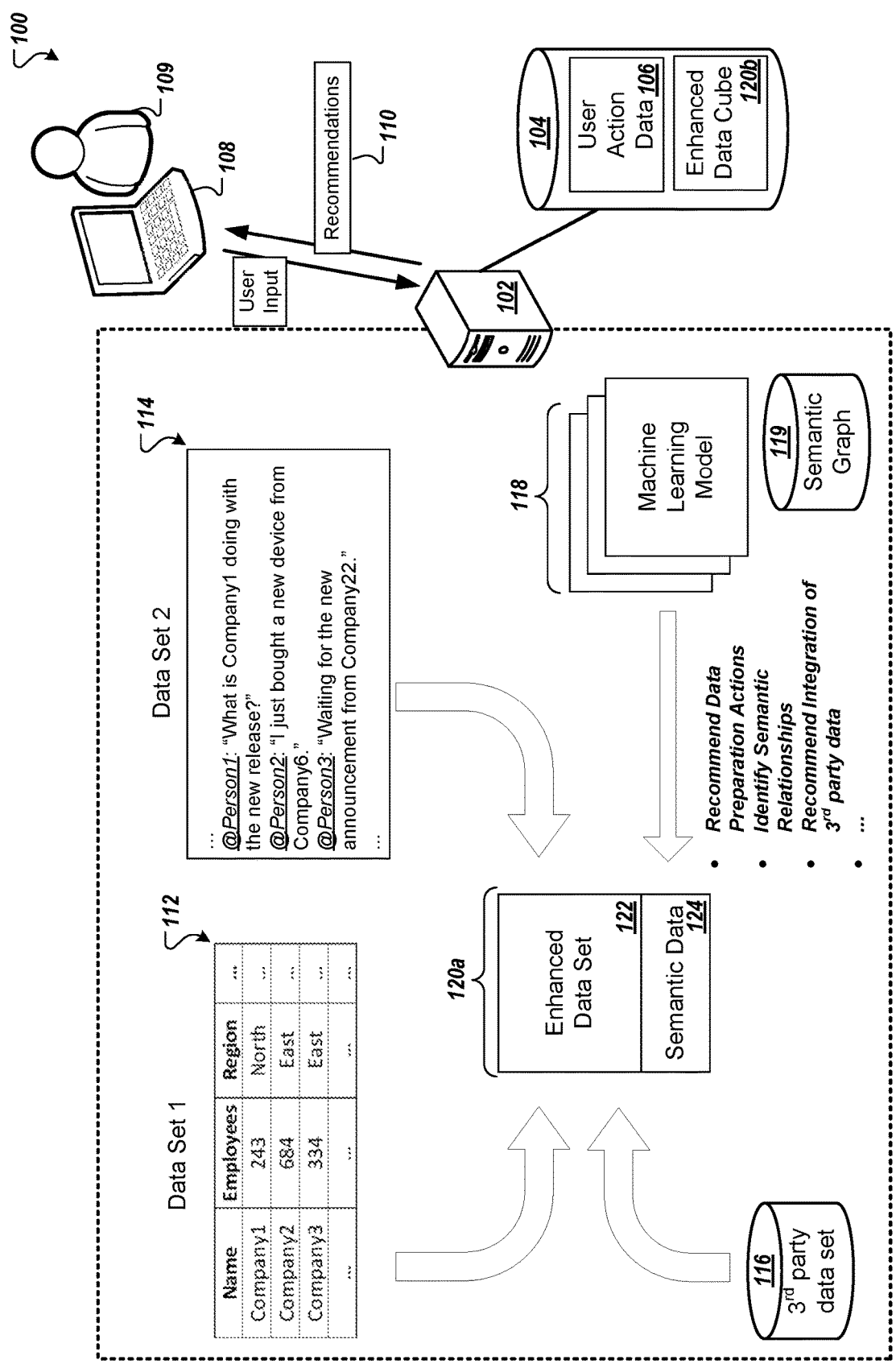
FIG. 1 is a diagram showing an example of a system for enhanced preparation and integration of data sets.

FIG. 1 is a diagram showing an example of a system 100 for enhanced preparation and integration of data sets. The system 100 includes a computer system 102 having data storage 104, and a client device 108. The computer system 102 can streamline the process of importing new data into an analytics platform. For example, the computer system 102 can receive a data set from any of various sources, such as spreadsheets, comma-separated value (CSV) files, customer relationship management (CRM) systems, office productivity software, cloud computing platforms, and so on. The computer system 102 then processes the received data set to create a functional, queryable data cube without requiring the user 109 to have a knowledge of data warehousing. For example, the computer system 102 can generate a data model for the data set, generate a semantic layer for the data set, and clean the data set (e.g., by standardizing formatting, filtering data, converting data, and so on).

The computer system 102 can use one or more machine learning models 118 to provide recommendations 110 for preparing a data set. These recommendations 110 may be sent to a client device 108 associated with a user 109. The computer system 102 may also perform various actions automatically based on output of the machine learning models 118.

The computer system 102 can perform a wide variety of actions to facilitate the process of importing data and packaging it into a format for high-efficiency analytical processing (e.g., into an online analytical processing (OLAP) data cube). As an example, the computer system 102 can discover data sets. The computer system 102 can identify data types existing within the one or more data sets. The computer system 102 can perform operations or transformations on the one or more data sets. The computer system 102 can provide recommendations to a user on what operations should be performed on the one or more data sets. The computer system 102 can integrate the one or more data sets into an enhanced data set. The computer system 102 can provide recommendations to a user on how the one or more data sets should be integrated into an enhanced data set. The computer system 102 can identify semantic relationships within the individual data sets or within the enhanced data set in order to form a data model. The computer system 102 can provide recommendations to a user on how to classify the data in the one or more data sets or in the enhanced data set, including identified possible semantic relationships existing within the one or more data sets or within the enhanced data set. The computer system 102 can integrate third-party data into the enhanced data set. The computer system 102 can provide recommendations to a user on how third-party data should be integrated into the enhanced data set. In performing these actions, the computer system 102 may use one or more machine learning models 118.

Recommendations for processing a data set may include recommendations to perform various operations on the one or more data sets, such as table operations and data transformations. Recommendations may be based on previous users' actions. The computer system 102 can store user action data 106 indicating the actions that users have taken in the course of importing and preparing data sets. The computer system 102 can then use this history of actions to recommend the same or similar actions to users when new data sets are imported. The computer system 102 can also use the user action data 106 to train or update the machine learning models 118. This aspect and others discussed below enable the computer system 102 to learn on an ongoing basis and to adapt recommendations to new usage patterns and user preferences.

The computer system 102 may include one or more computing devices, such as a server system that may include multiple computers. The computer system 102 may communicate with the client device 108 over a communication network, such as a local area network (LAN), a wide area network (WAN), the Internet, and so on. The computer system 102 may communicate with third-party systems over a network. These third-party systems may include weather systems, mapping systems, social media systems, stock market data systems, news aggregators, etc. The computer system 102 may be able to access third-party data sets, such as the third-party data set 116, from the third-party systems.

These third-party data sets may include real-time data, such as news feeds, social media feeds, stock ticker feeds, etc.

The machine learning models 118 may include artificial neural networks, maximum entropy classifiers, decision tress, support vector machines, and/or regression models. The machine learning models 118 may be respectively trained or configured for particular types of data sets or for certain types of classifications. For example, some machine learning models 118 can be trained to evaluate structured data sets, other machine learning models 118 can be trained to evaluate streaming data sets, and yet other machine learning models 118 can be used to evaluate third-party data sets. The machine learning models 118 may be trained based on data indicating characteristics of a plurality of data sets and previous actions performed to alter the data sets in the plurality of data sets. These characteristics may include the type of data set (e.g., structured, streaming, or third-party), the semantic data associated with the data set, the values included in the data set, a size of the data set, etc. The previous actions performed by users, including actions initiated by users, may be stored as part of the user action data 106 in the data storage 104.

The client device 108 may be a computing device, such as a laptop computer, a desktop computer, a mobile phone, a smart phone, or a tablet.

The computer system 102 efficiently organizes, modifies, and integrates data sets. By leveraging prior user action data, the computer system 102 is able to train and utilize machine learning models 118. Using the machine learning models 118, the computer system 102 is able to recommend various operations to be performed on or with a data set to a user 109. This greatly reduces the time the user 109 would otherwise spend preparing a data set, e.g., analyzing, modifying, filtering, merging, and characterizing the data set. The computer system 102 can also automate the process of generating data models and semantic layers for data sets, so that the resulting data cubes include integrated semantic information.

In FIG. 1, the computer system 102 receives data indicating user input that identifies a first data set 112. The user 109 of the client device 108 can provide input selecting the data set 112 using the client device 108. In response to the user input, the computer system 102 retrieves the data set 112 and analyzes the data set 112. The data set 112 may be stored in data storage 104 or in a different storage location.

The computer system 102 may identify a second data set 114 that it determines to be related to the data set 112. In some cases, the user 109 specifies the second data set 114 and that the two data sets 112, 114 should be integrated or merged to enable use of the combined data from both data sets 112, 114. A data set may be identified as related to another data set if the two data sets have similar data, similar topics, similar owners or creators, or other characteristics in common. Similarity may be determined by comparing or matching the data or pieces of the data (e.g., keywords) within the data sets. In some implementations, the computer system 102 may recommend the second data set 114 for integration with the first data set 112, based on finding similarity between content or metadata of the first data set 112 and content of one of multiple streaming data sources available to the computer system 102, e.g., stock ticker data, TWITTER feeds, social media feeds, transaction streams, etc.

The computer system 102 may determine if data sets are related and/or similar. As an example, the computer system 102 may have identified the data set 114 after determining that it includes one or more of the companies named in the data set 112. To select the second data set 114 as being related to the first data set 112, the computer system 102 may use a machine learning model 118. For example, a machine learning model 118 may indicate a relationship, e.g., through a high confidence score or probability of similarity, between the data set 114 and the data set 112. For example, a machine learning model 118 may output a confidence score of 0.7 (out of 1.0), indicating a high confidence that the data set 112 and the data set 114 include the same or similar information, or are otherwise associated. This confidence score may be based on, or in part on, keyword matching. Here, because the two data sets both include the names of a number of the same companies, the data sets 112 and 114 may be determined to have a high similarity.

In some implementations, the user of client device 108 identifies both the data set 112 and the data set 114. In some implementations, the computer system 102 identifies the data set 112 and/or the data set 114 without user input. For example, the computer system 102 may initiate a data importing process for the data set 112 based on the data set being frequently accessed, newly created, newly accessible, or recently updated. The computer system 102 identifies the data set 114 based on its similarity to the data set 112. In selecting the other data set 114, the computer system 102 may use a machine learning model of machine learning models 118.

In some implementations, additional data sets, other than the data sets 112 and 114 are identified by either the user of the client device 108 or the computer system 102. These additional data sets may include one or more third-party data sets, such as the data set 116.

One of the benefits provided by the computer system 102 is the ability to merge standard structured or unstructured data sets with streaming data sets into an enhanced data cube 120. This allows generally static data to be combined with dynamic real-time incoming data, yet have the combined data be accessible through the familiar and efficient processing of OLAP data cubes. Once the enhanced data cube 120 is created, it can be accessed for analytic processing as a typical data cube would be accessed. The computer system 102, or another server system, can handle ongoing refreshing of data from the streaming data set(s) in a manner that is transparent to the analytics systems making use of the enhanced data cube 120. For example, as new data comes in from a streaming data source, the computer system 102 can convert the data into a structured form. This can include parsing incoming data, performing semantic processing, updating aggregations, and so on based on the incoming data.

Even though the data from the streaming data source may take many different forms (e.g., a series of transaction records, log data, user communications, etc.), the computer system 102 can refresh the enhanced data cube 120 to enable up-to-date information to be accessed as if it had been stored in a column-based table format. For example, the first data set 112 may represent a private data table about a company's customers and suppliers, and the second data set 114 may represent a public streaming source providing stock price information, news, or social media posts. The enhanced data cube 120 can link information from the streaming data with corresponding data from the private data table, for example, by creating new table columns representing the streaming data. These can be virtual columns that do not represent static data, but instead refer to cached and dynamically calculated values based on current and recent data from the streaming data source. The enhanced data cube 120 enables a user to query the entire data set as if it were all stored with a traditional column structure, even though the columns involving streaming data are continually updated, e.g., periodically or for each new request to the data cube 120.

The computer system 102 can use various techniques to enable streaming data to be integrated into an enhanced data cube 120. As one example, the computer system 102 can repeatedly update data of the enhanced data cube 120 at a time scale appropriate for the streaming data source (e.g., every second, every 5 seconds, every minute, as new data is received, and so on). The incoming streaming data can be stored in a cache that is then used to provide data accessed through the enhanced data cube 120. Depending on the parameters set for the enhanced data cube 120, the enhanced data cube 120 may provide data for a certain recent period, such as the last week, month, or year of data from the streaming data source.

In the example of FIG. 1, the data set 112 is a structured data set. For example, the data set 112 is a table having a plurality of rows and columns. The data set 112 includes a list of companies and corresponding information on each of the companies. This corresponding information includes a number of employees for each of the companies, and a region in which each of the companies are located. The data set 112 may include additional information corresponding to each of the companies, such as a number of offices, a company type, products, a zip code of where the company headquarters is located, an indication of whether the company is public or private, company sales, company profits, etc.

In the example of FIG. 1, the data set 114 is a streaming data set including social media data. For example, the data set 114 is a compilation of social media posts (e.g., tweets from one or more Twitter feeds), each including a name of a company. The data set 114 may be a substantially-real-time feed. The data set 114 may be continuously or constantly updated as new posts come available. Here, each of the companies (or one or more of the companies) named in the data set 114 stream may also be found in the data set 112 table. The data set 114 may be updated with posts including the name of any companies found in a list of companies. The computer system 102 may obtain the list of companies from column one ("Name") of the data set 112 table.

In some implementations, streaming data sets or feeds, such as the data set 114, include telemetry data. The telemetry data may be transferred wirelessly or through a wired connection to the computer system 102, or to another computer system that is able to communicate with the computer system 102 or accessible by the computer system 102. The telemetry data may include, for example, operation data about a computer system, status information about a computer system, precipitation data, pressure data, temperature data, or global positioning system (GPS) data (e.g., coordinates and/or time). As an example, the telemetry may be In some implementations, streaming data sets or feeds, such as the data set 114, include network traffic data. Network traffic data may include data indicating the amount and type of traffic on a particular network. Network traffic data may be in the form of data packets or logs of packet traffic that are provided to, or accessible by, the computer system 102.

In some implementations, streaming data sets or feeds, such as the data set 114, include transaction data. Transaction data may describe a series of events that each indicate a time, a reference to an object, and a numerical value associated with the referenced object. Transaction data may include financial data, such as records of orders, invoices, or payments. Transaction data may include work data, such as records of plans or activities. Transaction data may include logistics data, such as records of deliveries, storage records, or travel records.

In some implementations, streaming data sets or feeds, such as the data set 114, include user input data. The user input may include inputs provided by one or more users to a client device, e.g., to a user interface, an application, a web page, etc. The user input data can indicate actions such as clicks, taps, keystrokes, submissions of queries or requests, interactions with user interfaces, and so on.

After identifying the data set 112, the computer system 102 may generate semantic data for the data within the data set 112. In addition or as an alternative, the computer system may provide recommendations 110 as to what semantic data should be generated for the data set 112. The generated semantic data for the data set 112 may be included in the semantic data 124. The semantic data indicates a semantic interpretation for at least a portion of the data set 112. For example, the semantic data may indicate a label for a column, a data type for a column, and/or a specific interpretation or context for a data type (e.g., not just whether a column represents a phone number, but whether it is a home phone number, a cell phone number, a work phone number, etc.). The computer system 102 may access a semantic graph 119 that describes various objects and the relationships between those objects. The objects may represent, for example, users/people, places, things, data elements, and so on, as well as their attributes. The computer system 102 may use the semantic graph 119 used for identifying which data is related to other data. The semantic graph 119 may also include scores between objects, which the computer system 102 can use to determine whether to augment a data set with data for a related object. The computer system 102 can compare the semantic graph 119 data (e.g., relevant objects identified and/or scores for relationships between objects) with the data of data sets 112, 114 to identify semantic meanings for different portions of the data sets 112, 114.

Moreover, the semantic graph 119 may indicate actions taken by users or taken by particular users. For example, the semantic graph 119 may include indications of what data join actions were previously performed by users, what data join actions were previously performed by the user 109, what data join recommendations were previously selected by users, what data join recommendations were previously selected by the user 109, what data join recommendations were previously rejected by users, what data join recommendations were previously rejected by the user 109, or the like, e.g., for given data sets, types of data sets, types of data included in the data sets, etc. The computer system 102 may access the semantic graph 119 and use it to make predications and/or generate one or more recommendations. For example, the computer system 102 may access the semantic graph 119, and, based at least in part on the information in the semantic graph 119 indicating that users have generally selected an inner join operation for the two data sets 112 and 114, generating an inner join recommendation for the user 109.

The computer system 102 can input the semantic graph 119 data to the one or more machine learning models 118. When users opt for a recommendation or opt against a recommendation, an indication of those actions will back into the one or more machine learning models 118. For example, based at least in part on the information in the semantic graph 119 indicating that users have generally selected an inner join operation for the data sets that are similar to the data sets 112, 114, the one or more machine learning models may output an inner join operation as a recommended data preparation action for the user 109 as part of the recommendations 110. An indication of those user actions may also be used by the computer system 102 to update the semantic graph 119.

Generating semantic data within the data set 112 or providing recommended semantic data to generate for the data set 112 may include identifying metrics, identifying attributes, identifying data elements, applying labels, specifying a data type, identifying data dimensions, and/or identifying one or more attribute hierarchies. Generating semantic data or a recommendation for generating semantic data may include analyzing the semantic data of one or more other data sets that are similar to the data set 112, where the semantic data of those one or more other data sets was previously generated by a user or previously approved by a user. These one or more other data sets may be found in the data storage 104. Previous user-generated semantic data or approval of generated semantic data may be part of the user action data 106 within the data storage 104. Where a recommendation is provided for the semantic data, the recommendation may include any identified metrics, identified attributes, identified data elements, applied labels, specified data types, identified data dimensions, and/or identified attribute hierarchies. The recommendation may also include all or part of the data set 112. The recommendation may be part of the recommendations 110 and sent to the client device 108.

If the user 109 of the client device 108 indicates an acceptance of the recommendation, data indicating the acceptance will be sent from the client device 108 to the computer system 102. In response to determining that the recommendations have been accepted, the computer system 102 generates the semantic data in accordance with its provided recommendation. Any generated semantic data for the data set 112 may make up or be included in the semantic data 124. If the user 109 of the client device 108 indicates a partial acceptance of the recommendation (e.g., makes some changes to the identified metrics, attributes, dimensions, or hierarchies), the computer system 102 will take into account any changes made by the user and generate the semantic data accordingly. Changes by the user of the client device 108 to the recommendation may be stored as part of the user action data 106 in data storage 104. If the user of the client device 108 rejects the recommendations, the computer system 102 may wait for the user of the client device 108 to create the semantic data, e.g. wait for the user to identify the metrics, attributes, dimensions, and/or hierarchies within the data set 112. The user created semantic data may be stored as part of the user action data 106 in the data storage 104.

After identifying the data set 114, the computer system 102 may generate semantic data for the data within the data set 114 or may provide recommendations as to what semantic data should be generated for the data set 114 to a user. Any generated semantic data for the data set 114 may be included in the semantic data 124. The computer system 102 may generate semantic data or recommend semantic data in accordance with the methods described above with respect to the data set 112.

After generating of the semantic data for the data set 112, the computer system 102 may provide feature data of the data set 112 to one or more machine learning models 118. The feature data indicates characteristics of the data set 112. The feature data may include a structure of the data set 112 (e.g., a number of rows and columns), data types of the data set 112, one or more values within the data set 112, and some or all of the semantic data of the data set 112, such as metrics or attributes associated with the one or more values. The machine learning models 118 may generate output in response to the receiving the feature data for the data set 112, for example, classification scores or likelihoods indicating how relevant different data preparation actions are predicted to be for the data set 112. In this manner, the output may indicate one or more adjustments that should be made to the data set 112. For example, the output of the machine learning models 118 may predict how applicable different filtering, formatting, and aggregations are to the data set 112 and provide those predictions as a confidence score or probability score for each action.

After generating of the semantic data for the data set 114, the computer system 102 may provide feature data of the data set 114 to one or more machine learning models 118 in the same manner done for the data set 112. The machine learning models 118 may generate output for the data set 114 such as classification scores or likelihoods indicating how relevant different data preparation actions are predicted to be for the data set 114, e.g., with respect to the data set 112.

Based on the output from the machine learning models 118, the computer system 102 determines one or more adjustments to the data set 112. An adjustment to the data set 112 may include combining the data set 112 with the data set 114, performing a data table operation on the data set 112, performing a union operation for the data set 112 with respect to the data set 114, performing a join operation for the data set 112 with respect to the data set 114 (e.g., based on particular columns of data set 112 with particular data elements extracted from data set 114), deriving an additional attribute grouping for the data set 112, deriving an additional metric grouping for the data set 112, deriving an additional data element grouping for the data set 112, applying a label to a portion of the data set 112, specifying a data type for a portion of the data set 112, performing a different modification to the semantic data of the data set 112, defining a threshold for the data set 112, enriching the data set 112 to include data from the data set 114, creating an aggregation of a portion of the data set 112, and/or setting a formatting property for a portion of the data set 112.

The adjustment of combining the data set 112 with the data set 114 may include adding an additional column to the data set 112 table and populating the added column with a set of values determined based on an aggregation of a portion of the data set 114 streamed over a particular period of time. For example, based on the output of the one or more machine learning models 118, the computer system 102 may determine that the data set 112 and the data set 114 should be combined so that a new column for "News" is added to the data set 112. In this example, the computer system 102 may add values from the data set 114 stream data to the new column, where the values added are each associated with a time within a particular period of time (e.g., the past day, past week, past month, past year, etc.). The values within the new column added to the data set 112 may be repeatedly updated based on aggregations of the data set 114 streamed over a different time period. The values within the new column added to the data set 112 may be periodically updated as additional streaming data is received in the data set 114. These updates may be based on different sliding windows of the streaming data in the data set 114, where the sliding windows represent a same duration of time (e.g., one day, one week, one month, one year, etc.).

The computer system 102 generates recommendations 110 based on the determined adjustments to the data set 112 and provides those recommendations to a user of the client device 108. The computer system 102 may wait for a user of the client device 108 to respond to a recommendation of the recommendations 110 (e.g., indicate an acceptance or denial of a recommendation) before adjusting the data set 112. The computer system 102 may receive input from the user of the client device 108 indicating an acceptance or denial of one or more recommendations of recommendations 110. The received input may be stored by the computer system 102 as part of the user action data 106 in the data storage 104. In response to receiving input from the user of the client device 108 indicating an acceptance of a recommendation of the recommendations 110, the computer system 102 may adjust the data set 112. In response to receiving input from the user of the of the client device 108 indicating denial of a recommendation of the recommendations 110, the computer system 102 may request and/or receive data indicating the adjustments that the user made to the data set 112 differing from the recommendation. These actions may be stored by the computer system 102 as part of the user action data 106 in the data storage 104.

In some implementations, instead of providing one or more recommendations 110 to the user 109 of the client device 108, the computer system 102 makes the determined adjustments to the data set 112 itself without user input. The computer system 102 may make the adjustments itself after its determinations have reached a threshold level of confidence, after the machine learning models 118 have been trained for threshold period of time, or the machine learning models 118 have reached a threshold level of accuracy. Accuracy may be determined by how frequently users follow the recommendations provided by the computer system 102. The system can thus determine the frequency of recommendation acceptance or denial, and, when a denial occurs, the extent of deviation by the user from the recommendation (e.g., looking at how different the user's actions were from those recommended by the computer system 102).

The adjusted data set 112 or the combination of the data set 112 with the data set 114 forms the enhanced data set 122. The enhanced data set 122 with the semantic data 124 form an enhanced data cube 120a. The enhanced data cube 120a may be provided or made accessible by the computer system 102 to the client device 108. The enhanced data cube 120a may be provided or made accessible by the computer system 102 to additional client devices.

The enhanced data cube 120a may be modified by the data from a third-party data set 116. The computer system 102 may identify the third-party data set 116 based on its similarity to the enhanced data set 122, the data set 112, and/or the data set 114. The computer system 102 may identify the third-party data set 116 for integration with the enhanced data set 122 without user input. Alternatively, a user of the client device 108 may select the third-party data set 116 for integration into the enhanced data cube 120a. The computer system 102 may generate semantic data or recommendations to generate semantic data for the third-party data set 116 in accordance with the methods described above. After generating of the semantic data for the third-party data set 116, the computer system 102 may provide feature data of the third-party data set 116 to one or more machine learning models 118 in accordance with the methods described above. Based on the output of the one or more machine learning models, the computer system 102 may determine adjustments for the enhanced data set 122 to incorporate or otherwise take into account the data within the third-party data set 116. The determined adjustments may be performed by the computer system 102 after it has received approval from a user of the client device 108 (or, in some implementations, without the need for approval).

Modification of the enhanced data cube 120a results in the enhanced data cube 120b, which may be provided or made accessible by the computer system 102 to the client device 108. The enhanced data cube 120b may be provided or made accessible by the computer system 102 to additional client devices. The enhanced data cube 120b may be stored on the data storage 104.

Figure 2:
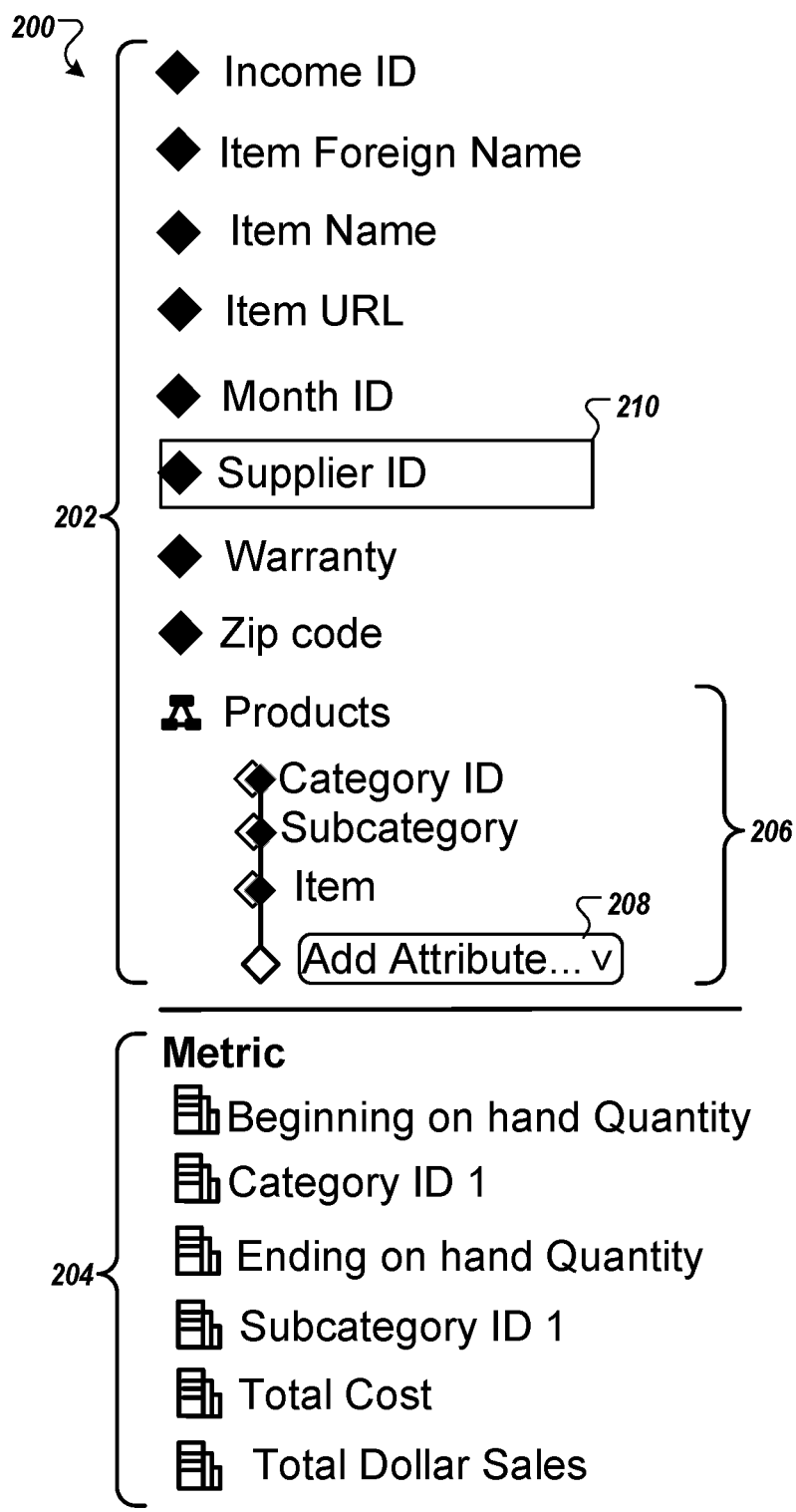
FIG. 2 is a diagram of a data model with semantic objects.

FIG. 2 is a diagram of a data model 200 with numerous semantic objects. The data model 200 represents an example of the types of labels or semantic classifications that the computer system 102 may be able to assign or infer from data sets. Of course, the labels or interpretations that the computer system 102 determines may be updated or altered by the user 109 when correction or clarification is needed.

The data model 200 includes a list of attributes 202. These attributes include income identifier, item foreign name, item name, item URL, month identifier, supplier identifier, warranty, zip code, products, category identifier, subcategory, and item. The data model 200 also includes a data dimension 206 formed from the attributes of products, category identifier, subcategory, and item. In the data dimension 206, the corresponding attributes are arranged in a hierarchy where the attributes of category identifier, subcategory, and item are arranged under the dimension of products. The data model 200 also includes metrics 204. These metrics include beginning on hand inventory quantity, category identifier 1, ending on hand inventory quantity, subcategory identifier 1, total cost, and total dollar sales. These metrics may be associated with a specific format.

If the user selects a dimension, they may be presented with a list of attributes belonging to a hierarchal level immediately below the selected dimension. Here, the user has selected the products dimension which displays the attributes of category identifier, subcategory, and item. A button 208 may also be provided which allows a user to add an attribute at a hierarchal level immediately below the selected products dimension.

The data model 200 may be presented to the user as part of the recommendations 110 as shown in FIG. 1. The data model 200 may be presented in order to suggest semantic data to be generated for a particular data set or a portion of a data set. Here, the system (e.g., the computer system 102 as shown in FIG. 1) may have emphasized the supplier identifier attribute 210. This emphasis on the supplier identifier attribute 210 may indicate a recommendation to the user to select this attribute to label or classify the data set or to be added to a list of attributes corresponding to the data set (e.g., each column of a data set having multiple columns may have one or more corresponding attributes). For example, upon an analysis of a given data set, the computer system 102 may have determined that the data set appears to contain data corresponding to suppliers such as names for the suppliers, addresses for the suppliers, phone numbers of the suppliers, or the like. Based on this analysis, the computer system 102 recommends that the supplier identifier attribute 210 be used to label the data set. A user, however, can choose to ignore this recommendation and select a different attribute to represent the data set or to be added to the data set.

Figure 3:
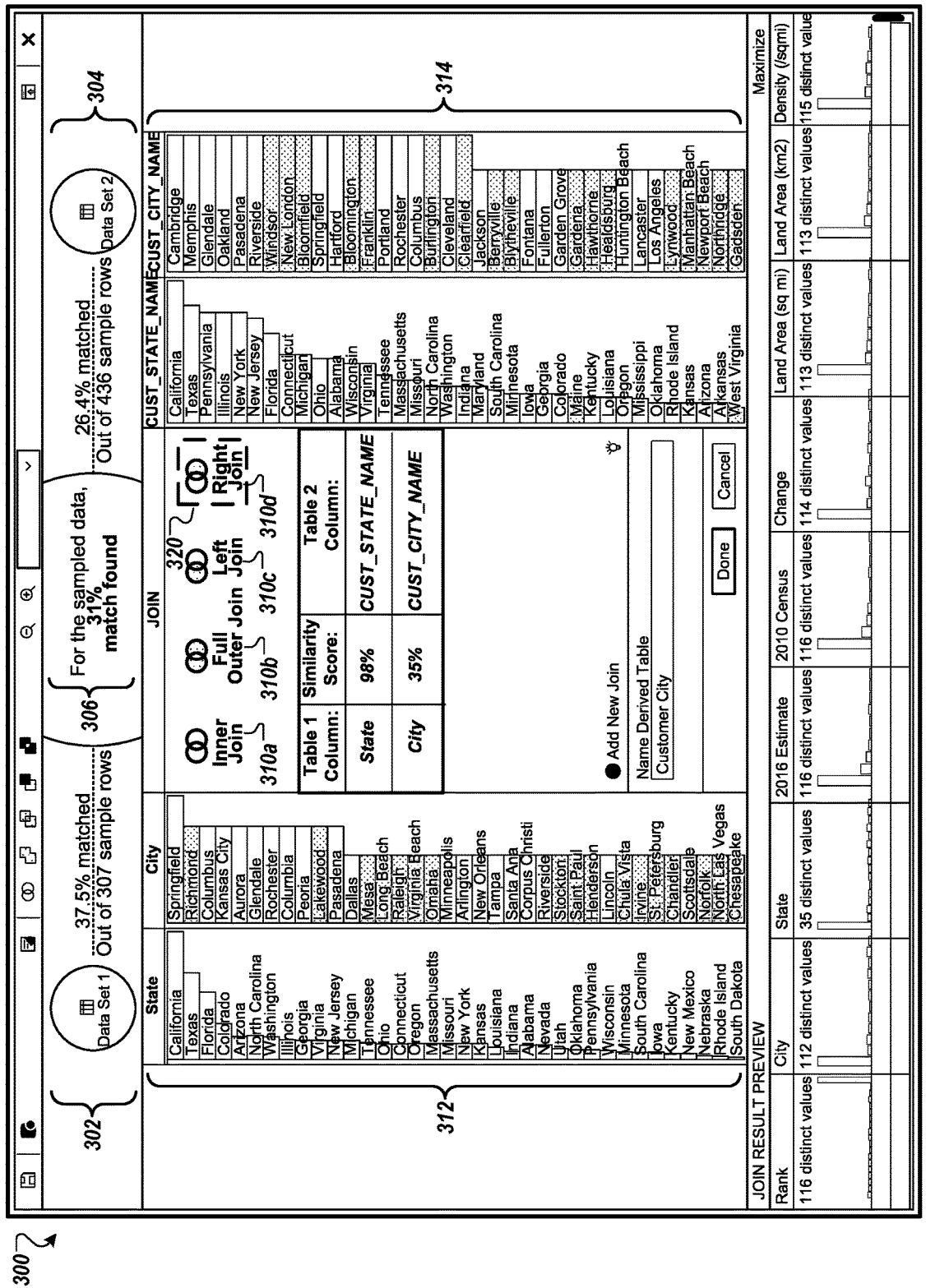
FIG. 3 is an example interface displaying a recommended table operation for two distinct data sets.

FIG. 3 is an interface 300 displaying a recommended table operation for two distinct data sets. The interface 300 can be displayed to the user 109 on the client device 108, as a way to visualize data sets being processed and to show recommendations 110 for the data sets. In the example of FIG. 3, the computer system 102 shows two recommended table join operations. In other words, the computer system 102 has identified two pairs of columns having similar content that are recommended to be joined in order to merge the data sets in an enhanced data cube.

A first data set 302 and its corresponding data 312 is shown on the left side of the interface 300. A second data set 304 and its corresponding data 314 is shown on the right side of the interface 300. The data sets 302, 304 may be structured data sets (e.g., tables). The system (e.g., the computer system 102 as shown in FIG. 1) has sampled both data sets 302 and 304 and compared the samples with each other. The system has sampled 307 rows of the data set 302. The system has sampled 436 rows of the data set 304. The comparison between the data sets 302 and 304 reveals that there is an estimated 37.5% match for the data set 302 with the data set 304, an estimated 26.4% match for the data set 304 with the data set 302, and an overall estimated match 306 of 31%. These estimated match percentages are determined by sampling each of the data sets 302, 304 and determining the percentage of matching values. As will be discussed in more detail below, the amount of samples taken from each data set 302, 304 may be a set amount or may be a percentage. Here, there are 307 samples taken from the data set 302 and 436 samples taken from the data set 304. In calculating the 37.5% match for the data set 302 with the data set 304, the computer system 102 determines what percentage of values of the 307 sample rows of the data set 302 are also found in (e.g., actually match) the 436 sample rows of the data set 304. Similarly, in calculating the 26.4% match for the data set 304 with the data set 302, the computer system 102 determines what percentage of values of the 436 sample rows of the data set 304 are also found in (e.g., actually match) the 307 sample rows of the data set 302. Finally, in calculating the overall match of 31%, the computer system 102 weighs each of the calculated matches with the number of samples taken, and then takes the average. This can be represented by:

$$31\% = \frac{(37.5\% \times 307 \text{ samples}) + (26.4\% \times 436 \text{ samples})}{743 \text{ samples}}$$

Based on the comparison of the data set 302 with the data set 304, the system (e.g., the computer system 102 as shown in FIG. 1) determines a recommendation and provides the user an indication of the recommendation. Here, the recommendation is to perform a right join operation 310d of the two data sets 302, 304. The recommendation may be based on the estimated match between the data set 302 and the data set 304 of 37.5%, based on the estimated match between the data set 302 and the data set 304 of 37.5% meeting a particular threshold, based on the estimated match between the data set 304 and the data set 302 of 26.4%, based on the estimated match between the data set 304 and the data set 302 of 26.4% not meeting a particular threshold, based on the overall estimated match of 31%, and/or based on the overall estimated match of 31 meeting a particular threshold. For example, if the overall estimated match dropped below 20%, then the computer system 102 may not have recommended any of the join operations 310a-310d. If the estimated match between the data set 304 and the data set 302 was 10% greater than the estimated match between the data set 302 and the data set 304, then the computer system 102 may have recommended a left join operation 310c.

In some implementations, the system (e.g., the computer system 102) takes the same number of samples for each data set. In other implementations, the number of samples taken from each data set corresponds with a percentage of each of the entire data sets. For example, the 307 sample rows of the data set 302 may represent 5% of the total number of rows of the data set 302 such that the data set 302 actually has 6140 rows. In this example, the 436 sample rows of the data set 304 may also represent 5% of the total number of rows of the data set 304 such that the data set 304 actually has 8720 rows.

The interface 300 displays various join operations 310a-310d. The interface 300 may initially display this "join" mode based on the recommendation by the system (e.g., computer system 102 as shown in FIG. 1). The join operations include an inner join operation 310a, a full outer join operation 310b, a left join operation 310c, and the right join operation 310d. Here, the right join operation 310d is currently selected as shown by the surrounding box 320. The box 320 on the right join operation 310d may represent the recommendation (e.g., of recommendations 110 as shown in FIG. 1) by the system. The user may choose not to select the right join operation 310d and may select one of the other join operations 310a-c.

The interface 300 also displays a preview of the currently selected operation between the data sets 302 and 304. Here, the preview displayed may be that of the right join operation 310d as this is currently selected as shown by the surrounding box 320. The preview visually identifies mismatched elements from the participating data sets 302 and 304. Specially, the mismatched elements may be emphasized by a different shade (or, in other implementations, color).

Figure 4:
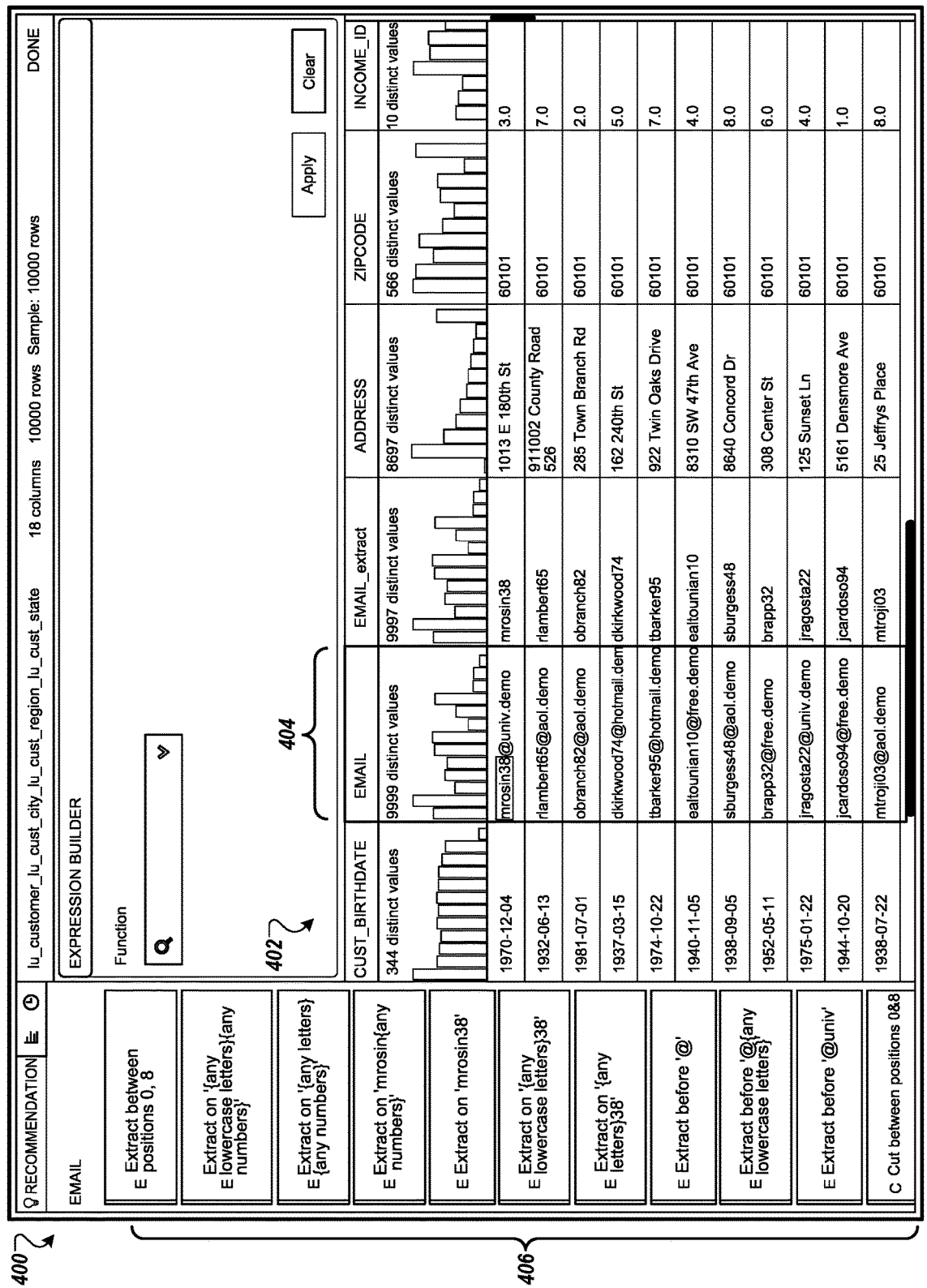
FIG. 4 is example interface displaying recommended data operations.

FIG. 4 is an interface 400 displaying a data set 402 and a number of recommended data operations 406. The data operations 406 are those operations that are recommended by the system (e.g., the computer system 102 as shown in FIG. 1) to be performed on a first row of a column 404 of the data set 402. Here, the data set 402 is a structured data set. For example, the data set 402 is a table including customer data. The column 404 represents a portion of the data set 402. For example, the column 404 is a list of email addresses for each of the customers. Each row of the column 404 includes an email for a specific customer.

The system (e.g., the computer system 102 as shown in FIG. 1) recommends a number of operations 406 for the email mrosin38@univ.demo found in a row of column 404. The operations 406 may be arranged by the system's confidence in the recommendation. That is, the operations 406 may be arranged vertically from those that are the highest recommended to those that are least recommended. These recommended operations 406 and/or confidence in each of the recommendations may be based on outputs from one or more machine learning models (e.g., machine learning models 118 as shown in FIG. 1). Alternatively, the recommended operations 406 may be arranged by a type of operation. For example, the recommended operations 406 may be arranged by whether they are an extract operation (as indicated by "E"), a cut operation (as indicated by "C"), an add operations, etc.

As shown, the recommended operations 406 include the operations of extracting the characters between positions 0 and 8 (which would extract "mrosin38"), extracting any lowercase letters and any numbers (which would extract "mrosin38univdemo"), extracting any letters and any numbers (which would extract "mrosin38univdemo"), extracting "mrosin" and any following numbers (which would extract "mrosin38"), extracting "mrosin38", extracting "38" and any letters preceding it (which would extract "mrosin38"), extracting all characters before "@" (which would extract "mrosin38"), extracting any lowercase letters before "@" (which would extract "mrosin38"), extracting all characters before "@univ" (which would extract "mrosin38"), and cut between position 0 and 8 (which would change the value of the row to "@univ.demo"). Here, "mrosin38" is highlighted in the interface 400. This emphasis on "mrosin38" may represent a preview of what information would be extracted if the first operation of the recommended operations 406 were performed.

Figure 5:
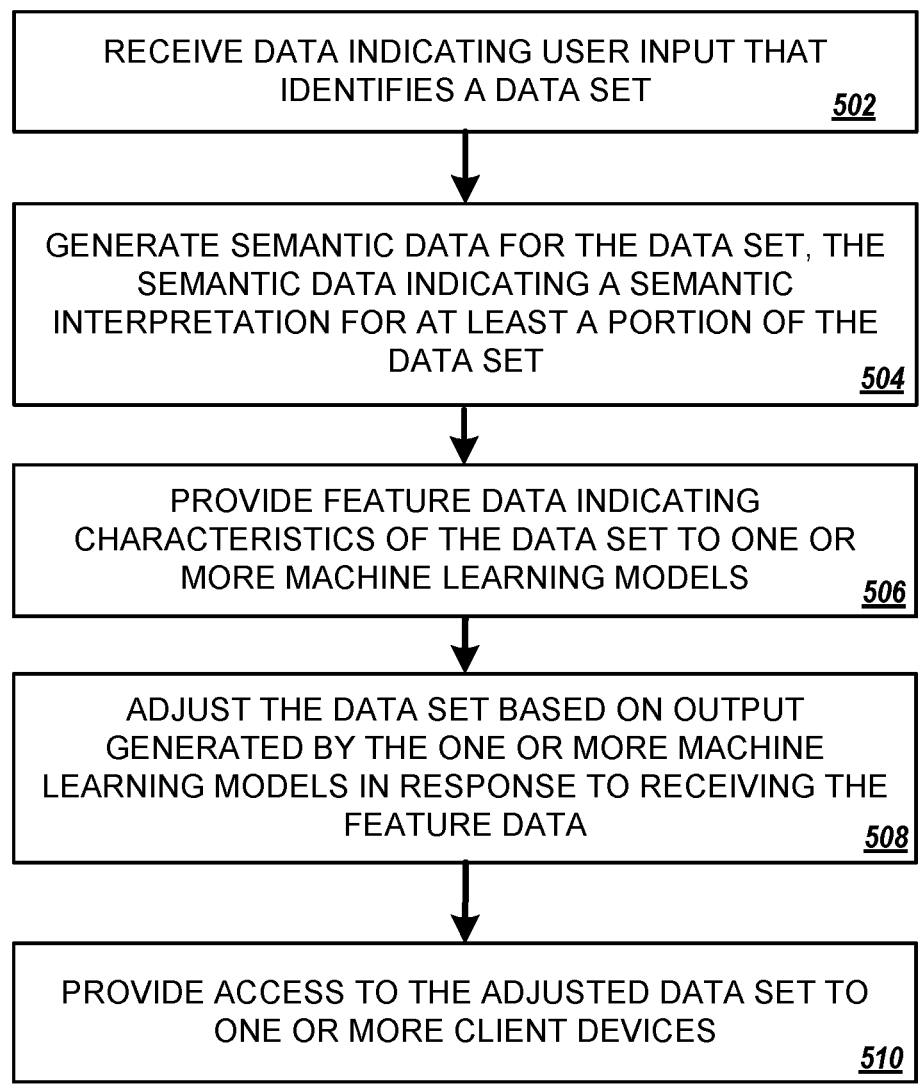
FIG. 5 is a flow diagram illustrating an example of a process for enhanced preparation and integration of data sets.

FIG. 5 is a flow diagram illustrating an example of a process 500 for enhanced preparation and integration of data sets. The process 500 can be performed, at least in part, using the computer system 102 described herein.

The process 500 includes receiving data indicating user input that identifies a data set (502). The data may include structured data, streaming data, and/or third-party data. The user input may be received by a system (e.g., the computer system 102 as shown in FIG. 1) from a client device (e.g., the client device 108 as shown in FIG. 1). The received data may be stored in a data storage of the system (e.g., the data storage 104 as shown in FIG. 1). The user input may be stored as part of user action data (e.g., user action data 106 as shown in FIG. 1) within the data storage.

The process 500 includes generating semantic data for the data set, the semantic data indicating a semantic interpretation for at least a portion of the data set (504). Generating semantic data for the data set may include identifying metrics, identifying attributes, identifying data elements, applying labels, specifying a data type, identifying data dimensions, and/or identifying one or more attribute hierarchies. Generating semantic data for the data set may include providing recommended semantic data to generate for the data set to a user, and receiving user input indicating an acceptance of the recommendation or input indicating a modification to the recommendation.

The process 500 includes providing feature data indicating characteristics of the data set to one or more machine learning models (506). The feature data may include a structure of the data set (e.g., a number of rows and columns), one or more values within the data set, and some or all of the generated semantic data of the data set, such as metrics or attributes associated with the one or more values. The machine learning models may include one or more artificial neural networks, one or more maximum entropy classifiers, one or more decision tress, one or more support vector machines, and/or one or more regression models. The machine learning models may include the machine learning models 118 as shown in FIG. 1.

The process 500 includes adjusting the data set based on output generated by the one or more machine learning models in response to receiving the feature data (508). Adjusting the data set may include combining the data set with a one or more other data sets, performing a data table operation on the data set, performing a union operation for the data set with respect to one or more other data sets, performing a join operation for the data set with respect to one or more other data sets, deriving an additional attribute grouping for the data set, deriving an additional metric grouping for the data set, deriving an additional data element grouping for the data set, applying a label to a portion of the data set, specifying a data type for a portion of the data set, performing a different modification to the semantic data of the data set, defining a threshold for the data set, enriching the data set to include data from one or more other data sets, creating an aggregation of a portion of the data set, and/or setting a formatting property for a portion of the data set. Adjusting the data set may include determining one or more adjustments to the data set, providing those adjustments to a user, and receiving user input indicating an acceptance or denial (or modification) to the recommended adjustments.

The process 500 includes providing access to the adjusted data set to one or more client devices (510). The adjusted data set may be sent over a wired or wireless connection. The one or more client devices may include client device 108 as shown in FIG. 1.

Providing access to the adjusted data set (e.g., hybrid data set) may include providing one or more application programing interfaces (APIs). The one or more APIs may provide endpoints that allow users or particular users to access the adjusted data set. For example, the computer system 102 may send instructions to the client device 108 for using an API to access the enhanced data cube 120a, or one or more particular pipelines of the enhanced data cube 120a.

Figure 6:
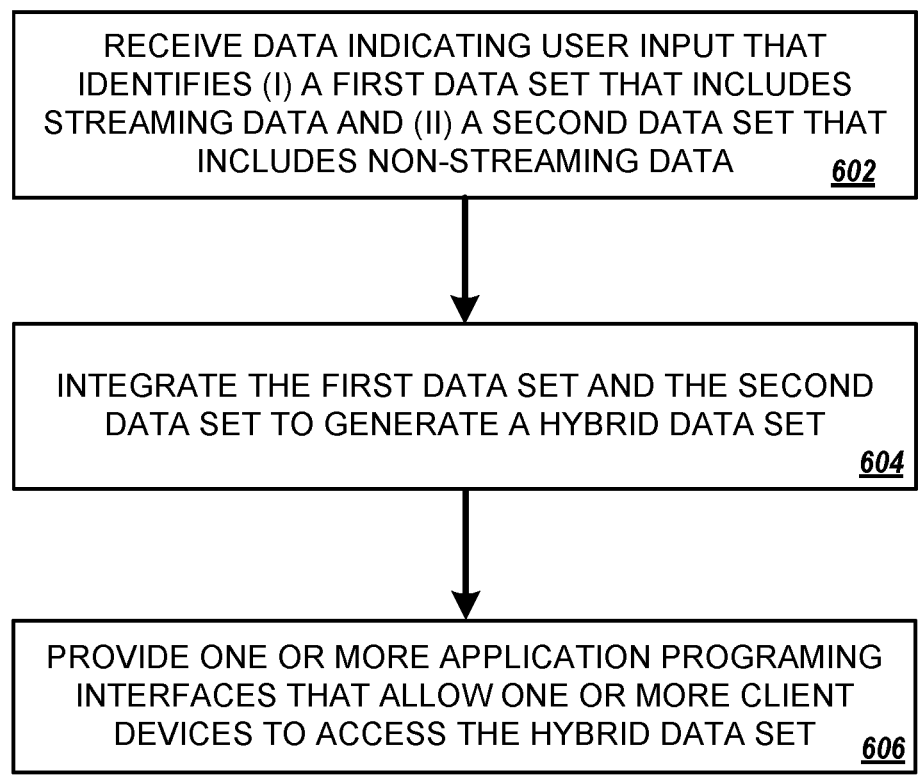
FIG. 6 is a flow diagram illustrating an example of a process for enhanced preparation and integration of data sets.

FIG. 6 is a flow diagram illustrating an example of a process 600 for enhanced preparation and integration of data sets. The process 600 can be performed, at least in part, using the computer system 102 described herein. The process 600 enables the computer system 102 to integrate streaming data and non-streaming data into a single cohesive data set, so that all components of the data set, whether streaming or non-streaming (e.g., records or tables), can be accessed through different access modes. For example, the streaming data can be supplemented with values from the non-streaming data to provide an enhanced data stream, and values derived from the data stream can be added to the non-streaming data set. This allows the computer system 102 to make the integrated data set available and to appear to a client device or service as if the data set were any of multiple different types of data structures (e.g., a data stream, a table or set of tables, a data cube, or other data structure) and to provide data through the APIs and access protocols of each, even though at least some components of the integrated data set would not be accessible in that manner.

The process 600 includes receiving data indicating user input that identifies (i) a first data set that includes streaming data and (ii) a second data set that includes non-streaming data (602). As an example, with respect to FIG. 1, the first data set 112 may be a non-streaming data, here a table. Other types of non-streaming data may include data cubes, batch data, or otherwise static data. In contrast, the second data set 114 may be a streaming data, here a feed of social media posts. Other streaming data may include, for example, stock price information, news, etc. The first data set and the second data set may be accessed by the computer system 102 and/or sent to the computer system 102.

The user input may be in the form of a message or notification sent to the computer system 102, e.g., from the client device 108. The user input may include identifiers for the different data sets that are to be integrated, e.g., into a hybrid data set. For example, the user input may include a name for a table that serves as the non-streaming data and a link for an RSS feed that corresponds to a data stream of news information.

In some implementations, the computer system 102 generates recommendations for two or more data sets to be integrated. For example, based on a comparison results indicating a sufficient similarity between two data sets or the output of one or more machine learning models similarly indicating sufficient similarity between two data sets, the computer system 102 may generate a recommendation to transmit to the client device 108. The recommendation may include one or more identifiers for the two data sets and/or a portion of one or both of the two data sets (e.g., sampled portions of the two data sets). Here, the user input may be made in response to a selection made at the client device 108 by the user 109. The selection made by the user 109 may correspond to a confirmation that the recommended data sets should be integrated.

In some implementations, receiving data indicating user input that identifies the first data set that includes streaming data includes receiving data indicating user input that identifies the first data set that includes streaming data from multiple different sources. The multiple different sources may include, for example, social media data streams, telemetry data streams, network traffic data, transaction data, or user input data. The multiple different sources may be fed to the first data set from one or more stream-processing software platforms.

In some implementations, receiving data indicating user input that identifies that first data set that includes streaming data includes filtering the streaming data. For example, the computer system 102 may filter the streaming data to remove superfluous data (e.g., data that the user 109 of the client device 108 has previously indicated is superfluous, such as particular data types, particular data objects, particular semantic information, etc.), duplicate information, etc. Filtering the streaming data may be one step in a series of preprocessing steps that are performed on the streaming data as it comes in, e.g., in real-time or near-real time.

In some implementations, receiving data indicating user input that identifies that second data set that includes non-streaming data includes filtering the non-streaming data. For example, the computer system 102 may filter the non-streaming data to remove superfluous data (e.g., data that the user 109 of the client device 108 has previously indicated is superfluous, such as particular data types, particular data objects, particular semantic information, etc.), duplicate data, etc.

In some implementations, the user input specifies one or more forms that the user or an anticipated recipient of the integrated data sets would like to digest the integrated data. For example, the user input may specify one or more particular forms that they request to view a combined data set (e.g., hybrid data set) formed from the first data set and the second data set in. In more detail, the user input may specify that the user 109 wants to view the combined data set as one or more of a data cube, a relational data base table, one or more different type of visualizations (e.g., bar graphs, histograms, etc.), or a data stream. The user input may further specify, if it is not inherent to the form of data, whether the requested form is streaming data (e.g., continuously updated as incoming stream messages are received) or periodically updated data (e.g., updated every fifteen minutes, thirty minutes, hour, etc. using data received since a prior update).

As will be described in more detail below, the computer system 102 has the ability to translate the combined data set into one or more different forms at any time. For example, the combined data set (e.g., hybrid data set) may include multiple access channels, including a first access channel that provides access to streaming data (e.g., streaming messages are provided as they are received, consistently updated as new streaming messages are received, etc.) and a second access channel that provides access to non-streaming data that is periodically refreshed.

Where the user input specifies a form to use, the user input may specify a particular form for the streaming access channel and a particular form for the non-streaming access channel. For example, the user input may specify that the streaming access channel should present the streaming data as a histogram. Similarly, the user input may specify that the non-streaming access channel should present the streaming data as a relational database table.

In some implementations, the user input also specifies how often data is to be updated. For example, the user input may specify the periodic refresh rate the non-streaming data of the second access channel. Similarly, the computer system 102 may generate a recommendation for a periodic refresh rate that can be accepted or modified by the user 109 using the client device 108. The refresh rate may be selected by the computer system 102 automatically based on characteristics of the data set. For example, the characteristics may indicate a computational demand that is required to refresh the non-streaming data of the combined data set and the determined refresh rate may be based on this computational demand and/or based on other factors (e.g., how often stream messages are coming in from the first data set or from one or more third-party data sets that are being integrated). As an example, the refresh rate may be based on the size of the data sets, whether any third-party data sets are being integrated to form the combined data set, the size of the third-party data sets, the often new stream messages are being received from the first data set and/or any third-party data sets, etc.

In some implementations, receiving the first data set that includes the streaming data includes receiving a data set that includes one or more substantially-real-time streams. These streams may include various feeds, such as RSS feeds, social media streams, streams from one or more sensors or devices, streams from a collection of sensors or devices, etc. There may be various, different sources for multiple real-time streams included in the first data set.

In some implementations, receiving the first data set that includes the streaming data includes receiving a data set that includes at least one of social media data, telemetry data, network traffic data, transaction data, or user input data.

In some implementations, receiving the second data set that includes the non-streaming data includes receiving a data set that includes at least one of batch data or static data.

The process 600 includes integrating the first data set and the second data set to generate a hybrid data set (604). As an example, the hybrid data set may be a data cube or other data structure generated from the first data set that includes streaming data and the second data set that includes non-streaming data. The data cube may include multiple processing pipelines for different levels of aggregation of component data sets, including data sets published in different portions of the computer system 102. For example, one or more of the data sets may be stored in RAM (e.g., for a mixture of streaming and non-streaming data) of the computer system 102 while one or more other data sets are stored in cache (e.g., for streaming data), and still others may be stored in non-volatile storage (e.g., for non-streaming data). The component data sets may include the first data set and the second data set, in addition to one or more other data sets, such as the third-party data set 116 shown in FIG. 1.

The computer system 102 can provide access to the hybrid data set through a (i) non-streaming access channel that provides a periodically-refreshed summary of both the streaming data and the non-streaming data and (ii) a streaming access channel that provides a data stream based on combined data of the first data set and the second data set. As an example, the computer system 102 may periodically refresh the summary of both the streaming data and the non-streaming data at a predetermined interval, such as every fifteen minutes, every thirty minutes, every hour, etc. Continuing the example of using a data cube, the non-streaming access channel may represent a first pipeline of the multiple processing pipelines of the data cube, and the streaming access channel may represent a second pipeline of the multiple processing pipelines of the data cube.

In general, the access channels provide a way for clients to access (e.g., receive and/or view) at least a portion of the hybrid data set. The access channels may be made available by the computer system 102 through different application programming interface (API) calls. The access channels may provide access to different data representations, including static representations (e.g., data structures or visualizations that are in a static form such that they are updated periodically and generated using the both the streaming data of the first data set and the non-streaming data of the second data set) and streaming representations (e.g., data structures or visualizations that are in a streaming or ongoing form such that they are updated immediately upon receiving new stream messages and generated using the both the streaming data of the first data set and the non-streaming data of the second data set). The access channels may additionally or alternatively provide a summary of the hybrid data set, e.g., a current snapshot of the hybrid data set or of a portion of the hybrid data set. The summary of the hybrid data set may be a summary of changes that have occurred since a last refresh time.

In forming the streaming access channel, the computer system 102 may, for example, wait until it receives new stream messages in the streaming data of the first data set (or in one or more third-party data sets that were used to generate the hybrid data set), average or aggregated the data in the stream messages, identify corresponding portions of the non-streaming data, combine the averaged or aggregated streaming data with the corresponding portions of the non-streaming data, and output the combination over the streaming access channel (e.g., in the form of a raw data stream, a data structure, a data visualization, etc.). In aggregating the collected streaming data, the computer system 102 may add values extracted from the just received streaming data to corresponding collective values that are being tracked. In aggregating the collected streaming data, the computer system 102 may generate a summary of values on a rolling bases, such that one or more collective values are generated for a particular amount of time (e.g., before a new or replacement collective value is generated after the particular amount of time has elapsed).

In forming the non-streaming access channel, the computer system 102 may, for example, wait for a predetermined amount of time before refreshing the non-streaming data. In more detail, the computer system 102 may collect streaming data that it has received after a last-refresh time and before the predetermined amount of time has elapsed, may aggregated the collected streaming data or average the collected streaming data, identify corresponding portions of the non-streaming data, and, after a predetermined amount of time has elapsed, output the combination over the streaming access channel (e.g., in the form of a raw data stream, a data structure, a data visualization, etc.). In aggregating the collected streaming data, the computer system 102 may add values extracted from the collected streaming data to corresponding collective values that are being tracked. In aggregating the collected streaming data, the computer system 102 may generate a summary of values on a rolling bases (e.g., that may or may be the predetermined amount of time), such that one or more collective values are generated for a particular amount of time (e.g., before a new or replacement collective value is generated after the particular amount of time has elapsed).

The computer system can use the streaming access channel and the non-streaming access channel to present the hybrid data set in various different forms. As described above, the forms chosen may be based on selected preferences of the user 109 or preferences for one or more anticipated recipients (e.g., users having access to all or a portion of the hybrid data set). Additionally or alternatively, the forms may be automatically chosen by the computer system 102 (or automatically selected by the computer system 102 for recommendation to the user 109 or one or more other users) based on the characteristics of the first data set, the second data set, and/or one or more other data sets (e.g., the third-party data set 116) the that are being integrated to form the hybrid data set. The forms may include a data stream, in which case the computer system 102 may simply provide one or more users access to the streaming access channel or, in some cases, to the non-streaming access channel. Alternatively, providing a data stream may include providing a particular visualization of either the streaming access channel or the non-streaming access channel.

The forms may also or alternatively include data structures, such as one or more relational data base tables that are generated using the streaming data in the streaming access channel, the non-streaming data in the non-streaming access channel, or a combination of the streaming data and the non-streaming data (e.g., certain parts of a table may be updated as new stream message are received, while other parts of the table may be refreshed periodically). The data structures may also or alternatively include data cubes, e.g., having one or more pipelines that correspond to the streaming access channel and/or to the non-streaming access channel. The forms may also or alternatively include visualizations that are generated using the streaming data in the streaming access channel, the non-streaming data in the non-streaming access channel, or a combination of the streaming data and the non-streaming data. These visualizations may be generated using generated data structures, or the raw streaming or non-streaming data of the access channels. The visualizations may include one or more types of graphs, such as bar charts, histograms, etc.

As an example, a particular client may request that a hybrid data set be generated for fifty machines located on a production floor of a facility. The user input provided by the client may be used by the computer system 102 to identify a first data set containing a stream of telemetry data for all of the machines on the production floor, and a second data set containing locations of each of the machines on the production floor. The telemetry data in the first data set may indicate, for example, the current status (e.g., running, error, standby, etc.) for each machine and the actions that each machine are currently performing. The location data in the second data set may include, for example, coordinates, such as Cartesian coordinates for a plane formed by the production floor for each machine and/or GPS coordinates for each machine. The first data set and the second data set may also include identifiers for each of the machines that the computer system 102 can use to determine which portion of the telemetry data corresponds to portions of the location data. For example, in response to receiving a streaming message of telemetry data, the computer system 102 can extract an identifier corresponding to a particular machine that the telemetry data message corresponds to, optionally use the identifier to look up a profile for the particular machine and retrieve a second identifier for the particular machine that corresponds to the second data set, match the identifier of the first data set or the looked-up identifier to one of the identifiers in the second data set, and retrieve the location corresponding to that particular machine.

Continuing this example, the computer system 102 may integrate the first data set containing the telemetry data and the second data set containing the location data. In integrating the first data and the second data, the computer system 102 make one or more recommendations containing actions to perform that the computer system 102 can execute or can wait for a confirmation before executing. These actions may include a particular way to combine the data, e.g., with respect to FIG. 3, an inner join, a full outer join, a left join, a right join, etc. These actions may also include adding one or more elements to the combined data set, such as including one or more additional data sets (e.g., data sets that are third-parties with respect to the first and second data set). For example, the computer system 102 may determine that a third data set that includes one or more identifiers for each of the machines, a model for each of the machines, a manufacturer for each of the machines, a type for each of the machines, a year built for each of the machines, a year installed for each of the machines, etc. should be integrated with the first data set and the second data set. Accordingly, the computer system 102 may generate a recommendation to the user 109 to include the third data set with the first data set and the second data set to generate the hybrid data set. The computer system 102 may proceed to generate the hybrid data set from the first data set, the second data set, and the third data set.

The computer system 102 may provide a streaming access channel where incoming telemetry data is immediately used to update the streaming data in the streaming access channel. For example, a new stream message that indicates telemetry data for a first machine may be obtained by the computer system 102. In response to obtaining this message, the computer system 102 may identify corresponding portions of the second data set (e.g., a location for that machine) and the third data set (e.g., a model for that first machine and the manufacture for the first machine), and stream the telemetry data with the corresponding portions of the second and third data sets over the streaming access channel. That generate a data structure using the telemetry data and the location data.

Continuing this example, the computer system 102 may generate one or more data structures using the first, second, and third data sets. For example, the computer system 102 may generate a relational database table using the non-streaming data of the non-streaming channel that is updated using the first, second, and third data sets every five minutes. The table may, for example, have a series of columns that each correspond to a data type (e.g., status, current action, location, model, first identifier, second identifier, daily runtime for the machine, etc.) and a series of row that each correspond to a particular machine. After five minutes has elapsed since the last update of the table occurred, the computer system 102 may use data that has been received over the last five minutes to update the table. For example, if a status of a machine has changed over the last five minutes, the computer system 102 will update the value in the first column of the table to show that the status has changed from running to standby. The computer system 102 may also track collective data, such as a runtime for the machines. For example, if after five minutes has elapsed and a status for a particular machine is still showing running, the computer system 102 may add five minutes of run time to the collective daily run time for the machine.

The computer system 102 may proceed to use the table to generate one or more visualizations. For example, the computer system 102 may use the table to generate a histogram that indicates that number of errors experienced by the machines by manufacturer, run time, year built, action being performed when error occurred, etc. Alternatively, the computer system 102 may use the streaming data of the hybrid data set to generate one or more other visualizations. For example, the computer system 102 may generate a histogram from the histogram that indicates that number of errors experienced by the machines by manufacturer, run time, year built, action being performed when error occurred, etc. in real-time or substantially real-time as streaming data is received (e.g., as new telemetry data is obtained).

In generating the hybrid data set using the first data set containing telemetry data, the second data set containing location data, and the third data set, the computer system 102 may add other information, such as labels, identifiers, additional elements for a corresponding data structure (e.g., additional columns, rows, etc. for a table; additional pipelines for a data cube, etc.), etc. These additions may be pulled from the first data set, the second data set, the third data set, or one or more other data sets.

Continuing this example, the computer system 102 may provide the user 109 access to a streaming access channel that provides, for example, a histogram visualization of at least a portion of the hybrid data set, and a non-streaming access channel that provides, for example, a relational database table that is periodically updated.

In some cases, the data structures and visualizations are generated using only the non-streaming data in the non-streaming channel.

In some cases, the data structures and visualizations are generated using only the streaming data in the streaming channel.

In some implementations, integrating the first data set and the second data set to generate the hybrid data set includes: providing the first data set and the second data set as input to a machine learning model; obtaining an output from the machine learning model, where the output of the machine learning model indicates a level of similarity between at least a portion of the first data set and at least a portion of the second data set; and using the output of the machine learning model to integrate the first data set and the second data set into the hybrid data set, or to generate a recommendation for integrating the first data set and the second data set into the hybrid data set includes using the level of similarity between the at least portion of the first data set and the at least portion of the second data set to (i) identify the at least portion of the first data set and the at least portion of the second data set, and (ii) determine that the at least portion of the first data set and the at least portion of the second data set should be integrated.

For example, the computer system 102 may sample the first data set 112 and the second data set 114, and provide the sampled data sets as input to one or more of the machine learning models 118. The output of the one or more machine learning models may indicate that the two data sets have sufficient similarity such that they should be integrated, and/or may indicate that a first portion of the first data set 112 has sufficient similarity to a first portion of the second data set 114 to integrate the two portions. The computer system 102 may generate and send a recommendation to the client device 108 to combine the two data sets, or the two portions of the data sets.

The one or more machine learning models may be trained using previous data set selections for integrating data sets and/or on the characteristics of those data sets. The machine learning model may also be trained using user feedback it receives on its determined similarity level, a determination of similarity level sufficiency, or an indication of a correct similarity level or a correct similarity level sufficiency.

In some implementations, integrating the first data set and the second data set to generate the hybrid data set includes: providing the first data set and the second data set as input to a machine learning model; obtaining an output from the machine learning model, where the output of the machine learning model indicates one or more recommended actions to integrate the first data set with the second data set into the hybrid data set; and using the output of the machine learning model to integrate the first data set and the second data set into the hybrid data set, or to generate a recommendation for integrating the first data set and the second data set into the hybrid data set includes: performing the one or more recommended actions with the first data set and the second data set to generate the hybrid data set; or generating a notification that includes the one or more recommended actions, and transmitting the notification to one or more client devices.

For example, after providing the first data set 112 and the second data set 114 to one or more of the machine learning models 118, the computer system 102 may obtain an output from the one or more machine learning models that indicates that the two data sets should be integrated into a relational database table. Where the data sets are both tables, the output may indicate, for example, that a right join should be performed, that a left join should be performed, that an inner join should be performed, or that an outer join should be performed. Where one of the data sets is a table and other is not, the output of the machine learning model may indicate one or more actions to transform the non-table data set into a table (or to transform the table data set into a different data structure or visualization).

The one or more machine learning models may be trained using actions previously performed on data sets and/or on the characteristics of those data sets. The machine learning model may also be trained using user feedback it receives on one or more of the recommended actions, or on the totality of the recommended actions.

In some implementations, integrating the first data set and the second data set to generate the hybrid data set includes: accessing historical data that indicates how one or more other data sets have previously been integrated; determining, from the historical data, one or more actions to integrate the first data set with the second data set; and integrating at least a portion of the first data set with at least a portion of the second data set by performing the one or more actions, or generating a recommendation to integrate least a portion of the first data set with at least a portion of the second data set, where the recommendation includes an indication of the one or more actions. As an example, this historical data may be stored in the data storage 104.

In some implementations, the method includes generating signatures that interrelate previously performed actions in the historical data with particular characteristics of data sets that the previously performed actions were performed on, and storing the signatures in the historical data, where determining, from the historical data, the one or more actions to integrate the first data set with the second data set includes: determining characteristics for the first data set and the second data set; identifying one or more signatures in the historical data that correspond to the first data set and the second data set by comparing the characteristics for the first data set and the second data set to the characteristics corresponding to different signatures in the historical data; and selecting the one or more actions in the historical data that correspond to the one or more signatures. As an example, the computer system 102 may recognize patterns that indicate (i) how certain data sets are similar or are likely to be integrated, and/or (ii) what actions are typically performed on data sets having certain characteristics, combinations of data sets having certain characteristics, and/or combinations of data sets having a sufficient level of similarity (e.g., in order to be integrated).

In some implementations, determining the characteristics for the first data set and the second data set includes: sampling the first data set to obtain a first subset of data; sampling the second data set to obtain a second subset of data; and analyzing the first subset of data and the second subset of data to determine the characteristics. For example, the with respect to FIGS. 1 and 3, the computer system 102 may analyze the Data Set 1 and the Data Set 2 to determine that 37.5% of the 307 sampled rows in Data Set 1 matched the 436 sampled rows of the Data Set 2, that 26.4% of the 436 sampled rows of Data Set 1 matched the 307 sampled rows of Data Set 1, and that there was an overall match of 31%. These matching percentages may serve as data characteristics indicating that similarity between the data sets. This similarity may be used by the computer system 102 to identify actions that are typically performed on data sets having this similarity. The computer system 102 may also determine in analyzing the two data sets that both data sets include geographic type information, specifically state and city information. The computer system 102 may also determine in analyzing the two data sets that both data sets are tables.

In some implementations, analyzing the first subset of data and the second subset of data includes at least one of the following: comparing the first subset of data and the second subset of data to determine a level of similarity between the first subset of data and the second subset of data; determining a type of data in the first subset of data, the second subset of data, or both the first subset of data and the second subset of data; determining a cardinality of the first subset of data, the second subset of data, or both the first subset of data and the second subset of data; determining a distribute of the first subset of data, the second subset of data, or both the first subset of data and the second subset of data; determining a range of values in the first subset of data, the second subset of data, or both the first subset of data and the second subset of data; determining a variance of the first subset of data, the second subset of data, or both the first subset of data and the second subset of data; determining a data size of the first subset of data, the second subset of data, or both the first subset of data and the second subset of data; determining a data source of the first subset of data, the second subset of data, or both the first subset of data and the second subset of data; determining a date and time associated with the first subset of data, the second subset of data, or both the first subset of data and the second subset of data; or determining a user associated with the first subset of data, the second subset of data, or both the first subset of data and the second subset of data.

In some implementations, generating signatures that interrelate previously performed actions in the historical data with data sets having particular characteristics includes generating signatures that specify one or more of the following: a level of similarity between data sets; a particular data type of a data set or a portion of a data set; a cardinality of a data set or a portion of a data set; a distribution of a data set or a portion of a data set; a range of values in of a data set or a portion of a data set; a variance of a data set or a portion of a data set; a data size or data size range of a data set or a portion of a data set; a data source of a data set or portion of a data set; a date or time associated with a data set or a portion of a data set; or a user associated with a data set or a portion of a data set.

In some implementations, determining the one or more actions to integrate the first data set with the second data set to generate the hybrid data set includes determining a set of preprocessing actions to perform on at least one of the first data set or the second data set prior to integrating the first data set and the second data set, where the preprocessing actions may include performing one or more of the following: removing a portion of data from the first data set; removing a portion of data from the second data set; modifying a format of at least a portion of data in the first data set; modifying a format of at least a portion of data in the second data; applying a series of transformation to the first data set; applying a series of transformations to the second data set; sampling the first data set; or sampling the second data set.

In some implementations, determining the one or more actions to integrate the first data set with the second data set to generate the hybrid data set includes determining to cache at least a portion of the first data set. For example, with respect to FIG. 1, the computer system 102 may cache the ten most recent stream messages (e.g., social media posts) received in the data set 114. Contrary to this, the first data set 112 may be stored in non-volatile memory such as the data storage 104, a cloud-based data storage, an external database, etc.

In some implementations, determining the one or more actions to integrate the first data set with the second data set to generate the hybrid data set includes determining to join at least a portion of the first data set with at least a portion of the second data set. For example, the computer system 102 may determine that only the data set 114 is relevant to only the first two columns of the data set 112. In generating the hybrid data set, the computer system 102 may use only the first two columns of the data set 112 to integrate with the data set 114.

In some implementations, determining the one or more actions to integrate the first data set with the second data set to generate the hybrid data set includes determining to visualize at least a portion of the data sets, where at least a portion of the data sets includes one or more of the following: at least a portion of the first data set; at least a portion of the second data set; a join of at least a portion of the first data set with at least a portion of the second data set; or an overlay of at least a portion of the first data set and at least a portion of the second data set.

In some implementations, determining to visualize the at least portion of the data sets includes determining to visualize the at least portion of the data sets as one or more histograms that describe different characteristics of the at least portion of the data sets. For example, with respect to FIG. 4, each data type of a hybrid data set (e.g., the data set 402) may be represented by a streaming/on-going or non-streaming (e.g., periodically refreshed) histogram.

In some implementations, determining the one or more actions to integrate the first data set with the second data set to generate the hybrid data set includes determining to add (i) a structured data element to the first data set, the second data set, or to a data set resulting from a combination of the first data set and the second data set, (ii) one or more labels to the first data set, the second data set, or to a data set resulting from a combination of the first data set and the second data set, (iii) one or more metrics to the first data set, the second data set, or to a data set resulting from a combination of the first data set and the second data set, (iv) one or more sources to the first data set, the second data set, or to a data set resulting from a combination of the first data set and the second data set, (iv) one or more access control restrictions to the first data set, the second data set, or to a data set resulting from a combination of the first data set and the second data set, or (v) data from one or more data sets that are third-parties with respect to the first data set and the second data set to the first data set, the second data set, or to a data set resulting from a combination of the first data set and the second data set. The computer system 102 may include one or more of these determinations in the recommendations 110. One or more of these determinations may be made by the computer system 102 using static algorithms, and/or one or more of the machine learning models 118.

The process 600 includes providing one or more application programing interfaces that allow one or more client devices to access the hybrid data set (606). For example, the computer system 102 may provide access to the hybrid data set, e.g., the enhanced data cube 120a, by providing instructions to use one or more application programing interfaces (APIs) to one or more client devices. The one or more APIs may provide endpoints that allow users or particular users to access the hybrid data set using corresponding client devices. For example, the computer system 102 may send instructions to the client device 108 for using a particular API call to access the enhanced data cube 120a, or one or more particular pipelines of the enhanced data cube 120a.

Particular API calls may correspond to different access channels, and/or to particular forms of the hybrid data set. For example, a first API call may provide the user 109 access to the non-streaming access channel, and a second API call may provide the user 109 access to the streaming access channel. The computer system 102 may also provide the user 109 a third API call that provides the user 109 access to a visualization such as a histogram of the hybrid data set generated using the streaming data of the streaming access channel, and a fourth API call that provides the user 109 access to a relational data base table that is generated using the non-streaming data of the non-streaming access channel.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database computer system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method of integrating data streams and non-streaming data sets in a data processing system, the method comprising:

receiving, by one or more computers of the data processing system, data indicating user input that identifies (i)

a first data set that includes streaming data and (ii) a second data set that includes non-streaming data;

in response to receiving the data indicating the user input, integrating, by the one or more computers, the first data set and the second data set to generate a hybrid data set, wherein the data processing system provides access to the hybrid data set through a (i) non-streaming access channel that provides a periodically-refreshed summary of both the streaming data of the first data set and the non-streaming data of the second data set and (ii) a streaming access channel that provides a data stream comprising data derived from the first data set and data derived from the second data set;

providing, by the one or more computers, one or more application programing interfaces, wherein the one or more application programming interfaces provide access to the hybrid data set through the non-streaming access channel and the streaming access channel;

receiving, by the one or more computers, a request from a client device to access the hybrid data set through the non-streaming access channel or the streaming access channel, the request being provided using the one or more application programming interfaces; and in response to receiving the request, providing, by the one or more computers, a response to the client device that includes data from the hybrid data set.

2. The method of claim 1, wherein integrating the first data set and the second data set to generate the hybrid data set comprises generating a data cube that includes multiple processing pipelines for different levels of aggregation of component data sets, including data sets published in different portions of the data processing system,
wherein the component data sets include at least the first data set and the second data set,
wherein the non-streaming access channel is a first pipeline of the multiple processing pipelines, and
wherein the streaming access channel is a second pipeline of the multiple processing pipelines.

3. The method of claim 1, wherein integrating the first data set and the second data set to generate the hybrid data set comprises:
providing data indicating characteristics of the first data set and the second data set as input to a machine learning model;
obtaining an output from the machine learning model, wherein the output of the machine learning model indicates a level of similarity between at least a portion of the first data set and at least a portion of the second data set; and
using the output of the machine learning model to (i) integrate the first data set and the second data set into the hybrid data set, or (ii) generate a recommendation for integrating the first data set and the second data set into the hybrid data set, wherein using the output of the machine learning model comprises using the level of similarity between the at least the portion of the first data set and the at least the portion of the second data set to (i) identify the at least the portion of the first data set and the at least the portion of the second data set, and (ii) determine that the at least the portion of the first data set and the at least the portion of the second data set should be integrated.

4. The method of claim 1, wherein integrating the first data set and the second data set to generate the hybrid data set comprises:
providing the first data set and the second data set as input to a machine learning model;
obtaining an output from the machine learning model, wherein the output of the machine learning model indicates one or more recommended actions to integrate the first data set with the second data set into the hybrid data set; and
using the output of the machine learning model to integrate the first data set and the second data set into the hybrid data set, or to generate a recommendation for integrating the first data set and the second data set into the hybrid data set comprises:
performing the one or more recommended actions with the first data set and the second data set to generate the hybrid data set; or
generating a notification that includes the one or more recommended actions, and transmitting the notification to one or more client devices.

5. The method of claim 1, wherein integrating the first data set and the second data set to generate the hybrid data set comprises:
accessing historical data that indicates how one or more other data sets have previously been integrated;
determining, from the historical data, one or more actions to integrate the first data set with the second data set; and
integrating at least a portion of the first data set with at least a portion of the second data set by performing the one or more actions, or generating a recommendation to integrate least a portion of the first data set with at least a portion of the second data set, wherein the recommendation includes an indication of the one or more actions.

6. The method of claim 5, comprising generating signatures that interrelate previously performed actions in the historical data with particular characteristics of data sets that the previously performed actions were performed on, and storing the signatures in the historical data,
wherein determining, from the historical data, the one or more actions to integrate the first data set with the second data set comprises:
determining characteristics for the first data set and the second data set;
identifying one or more signatures in the historical data that correspond to the first data set and the second data set by comparing the characteristics for the first data set and the second data set to the characteristics corresponding to different signatures in the historical data; and
selecting the one or more actions in the historical data that correspond to the one or more signatures.

7. The method of claim 6, wherein determining the characteristics for the first data set and the second data set comprises:
sampling the first data set to obtain a first subset of data;
sampling the second data set to obtain a second subset of data; and
analyzing the first subset of data and the second subset of data to determine the characteristics.

8. The method of claim 6, wherein generating signatures that interrelate previously performed actions in the historical data with data sets having particular characteristics comprises generating signatures that specify one or more of the following:
a level of similarity between data sets;
a particular data type of a data set or a portion of a data set;
a cardinality of a data set or a portion of a data set;
a distribution of a data set or a portion of a data set;

a range of values in of a data set or a portion of a data set;
a variance of a data set or a portion of a data set;
a data size or data size range of a data set or a portion of a data set;
a data source of a data set or portion of a data set;
a date or time associated with a data set or a portion of a data set; or
a user associated with a data set or a portion of a data set.

9. The method of claim 5, wherein determining the one or more actions to integrate the first data set with the second data set to generate the hybrid data set comprises determining a set of preprocessing actions to perform on at least one of the first data set or the second data set prior to integrating the first data set and the second data set, wherein the preprocessing actions may include performing one or more of the following:
removing a portion of data from the first data set;
removing a portion of data from the second data set;
modifying a format of at least a portion of data in the first data set;
modifying a format of at least a portion of data in the second data;
applying a series of transformation to the first data set;
applying a series of transformations to the second data set;
sampling the first data set; or
sampling the second data set.

10. The method of claim 5, wherein determining the one or more actions to integrate the first data set with the second data set to generate the hybrid data set comprises determining to cache at least a portion of the first data set.

11. The method of claim 5, wherein determining the one or more actions to integrate the first data set with the second data set to generate the hybrid data set comprises determining to join at least a portion of the first data set with at least a portion of the second data set.

12. The method of claim 1, wherein receiving the first data set that includes the streaming data comprises receiving a data set that includes one or more substantially-real-time streams.

13. The method of claim 1, wherein receiving the first data set that includes the streaming data comprises receiving a data set that includes at least one of social media data, telemetry data, network traffic data, transaction data, or user input data.

14. The method of claim 1, wherein the request is a request to access the hybrid data set through the non-streaming access channel; and
wherein providing the response comprises providing non-streaming data of the hybrid data set that includes data of the first data set and the second data set.

15. The method of claim 14, wherein the second data set comprises one or more database table columns, and wherein integrating the first data set and the second data set to generate a hybrid data set comprises:
defining one or more additional database table columns based on the first data set;
populating the one or more additional database table columns with values determined based on an aggregation of a portion of the streaming data in the first data set; and
updating the values in the one or more additional database table columns periodically or in response to the request;
wherein providing the non-streaming data of the hybrid data set comprises providing data from the one or more additional database table columns.

16. The method of claim 1, wherein the request is a request to access the hybrid data set through the streaming access channel; and
wherein providing the response comprises providing streaming data of the hybrid data set that includes data of the first data set and the second data set.

17. The method of claim 16, wherein integrating the first data set and the second data set to generate a hybrid data set comprises generating an enhanced data stream that includes streaming data of the first data set and added data from the second data set; and
wherein providing the streaming data of the hybrid data set comprises streaming data of the enhanced data stream.

18. The method of claim 17, wherein generating the enhanced data stream comprises supplementing one or more messages in the streaming data of the first data set with values from the second data set that are determined to be relevant to the one or more message.

19. A system comprising:
one or more computers of a data processing system; and
one or more computer-readable media storing instructions that, when executed, cause the one or more computers to perform operations comprising:
receiving, by the one or more computers of the data processing system, data indicating user input that identifies (i) a first data set that includes streaming data and (ii) a second data set that includes non-streaming data;
in response to receiving the data indicating the user input, integrating, by the one or more computers, the first data set and the second data set to generate a hybrid data set, wherein the data processing system provides access to the hybrid data set through a (i) non-streaming access channel that provides a periodically-refreshed summary of both the streaming data of the first data set and the non-streaming data of the second data set and (ii) a streaming access channel that provides a data stream comprising data derived from the first data set and data derived from the second data set;
providing, by the one or more computers, one or more application programing interfaces, wherein the one or more application programming interfaces provide access to the hybrid data set through the non-streaming access channel and the streaming access channel;
receiving, by the one or more computers, a request from a client device to access the hybrid data set through the non-streaming access channel or the streaming access channel, the request being provided using the one or more application programming interfaces; and
in response to receiving the request, providing, by the one or more computers, a response to the client device that includes data from the hybrid data set.

20. One or more non-transitory computer-readable media storing instructions that, when executed by one or more computers of a data processing system, cause the one or more computers to perform operations comprising:
receiving, by the one or more computers of the data processing system, data indicating user input that identifies (i) a first data set that includes streaming data and (ii) a second data set that includes non-streaming data;
in response to receiving the data indicating the user input, integrating, by the one or more computers, the first data set and the second data set to generate a hybrid data set, wherein the data processing system provides access to the hybrid data set through a (i) non-streaming access channel that provides a periodically-refreshed summary of both the streaming data of the first data set and the non-streaming data of the second data set and (ii) a streaming access channel that provides a data stream comprising data derived from the first data set and data derived from the second data set;

providing, by the one or more computers, one or more application programing interfaces, wherein the one or more application programming interfaces provide access to the hybrid data set through the non-streaming access channel and the streaming access channel;

receiving, by the one or more computers, a request from a client device to access the hybrid data set through the non-streaming access channel or the streaming access channel, the request being provided using the one or more application programming interfaces; and in response to receiving the request, providing, by the one or more computers, a response to the client device that includes data from the hybrid data set.

* * * * *

UNITED STATES PATENT AND TRADEMARK OFFICE
CERTIFICATE OF CORRECTION

| | | |
|---|---|---|
| PATENT NO. | : 11,567,965 B2 | Page 1 of 1 |
| APPLICATION NO. | : 17/156112 | |
| DATED | : January 31, 2023 | |
| INVENTOR(S) | : Rixin Liao et al. | |

It is certified that error appears in the above-identified patent and that said Letters Patent is hereby corrected as shown below:

In the Claims

In Claim 5, Column 34, Line 28, delete "least" and insert -- at least --.

In Claim 9, Column 35, Line 23, delete "data;" and insert -- data set; --.

Signed and Sealed this
Twenty-fifth Day of April, 2023

Katherine Kelly Vidal
*Director of the United States Patent and Trademark Office*